(12) United States Patent
Fuchizaki

(10) Patent No.: US 10,733,381 B2
(45) Date of Patent: Aug. 4, 2020

(54) NATURAL LANGUAGE PROCESSING APPARATUS, NATURAL LANGUAGE PROCESSING METHOD, AND RECORDING MEDIUM FOR DEDUCING SEMANTIC CONTENT OF NATURAL LANGUAGE ELEMENTS BASED ON SIGN LANGUAGE MOTION

(71) Applicant: The Japan Research Institute, Limited, Tokyo (JP)

(72) Inventor: Masahiro Fuchizaki, Tokyo (JP)

(73) Assignee: The Japan Research Institute, Limited, Tokyo (JP)

( * ) Notice: Subject to any disclaimer, the term of this patent is extended or adjusted under 35 U.S.C. 154(b) by 0 days.

(21) Appl. No.: 15/730,294

(22) Filed: Oct. 11, 2017

(65) Prior Publication Data
US 2018/0101520 A1 Apr. 12, 2018

(30) Foreign Application Priority Data
Oct. 11, 2016 (JP) .................................. 2016-200483

(51) Int. Cl.
*G10L 15/25* (2013.01)
*G06F 40/30* (2020.01)
(Continued)

(52) U.S. Cl.
CPC .............. *G06F 40/30* (2020.01); *G06F 40/40* (2020.01); *G06F 40/47* (2020.01);
(Continued)

(58) Field of Classification Search
USPC .................................. 704/231–257, 270–275
See application file for complete search history.

(56) References Cited

U.S. PATENT DOCUMENTS

| | | | |
|---|---|---|---|
| 5,953,693 A * | 9/1999 | Sakiyama | G09B 21/009 340/4.13 |
| 6,477,239 B1 * | 11/2002 | Ohki | G09B 21/009 348/14.01 |

(Continued)

OTHER PUBLICATIONS

Shigeru Takemura; "Syuwa-Nihongo Daijiten" (Sign language-Japanese Dictionary); Publication Office Kosaido Akatsuki Co., Ltd, Publication Division, 1999; ISBN978-4-331-50680-6 (with partial English language translation).

*Primary Examiner* — Jesse S Pullias
(74) *Attorney, Agent, or Firm* — Oblon, McClelland, Maier & Neustadt, L.L.P.

(57) ABSTRACT

A natural language processing apparatus configured to analyze a plurality of natural language elements, includes processing configured to input for each natural language element, multiple sign language images for a certain natural language together with the respective natural language, extract multiple feature points of a first sign language motion from the input sign language images and analyze a common point or a differing point between the first sign language motion and a second sign language motion, for each of the extracted feature points, deduce semantic content of the natural language element from the analyzed common point or the differing point, and a storage configured to store in association with the natural language element, information regarding the deduced semantic content. The processing circuitry analyzes the natural language using an artificial intelligence algorithm.

17 Claims, 32 Drawing Sheets

(51) Int. Cl.
*G06F 40/40* (2020.01)
*G06F 40/47* (2020.01)
*G06K 9/00* (2006.01)
*G10L 15/18* (2013.01)

(52) U.S. Cl.
CPC ..... *G06K 9/00302* (2013.01); *G06K 9/00355* (2013.01); *G10L 15/1822* (2013.01); *G10L 15/25* (2013.01)

(56) References Cited

U.S. PATENT DOCUMENTS

| | | | | |
|---|---|---|---|---|
| 8,793,118 | B2* | 7/2014 | Srinivasa | G09B 21/009 704/2 |
| 9,282,377 | B2* | 3/2016 | Bruner | H04N 21/4884 |
| 9,524,656 | B2* | 12/2016 | Peng | G06F 16/532 |
| 2009/0012788 | A1* | 1/2009 | Gilbert | G09B 21/009 704/235 |
| 2012/0116768 | A1* | 5/2012 | Bangalore | G06K 9/00355 704/254 |
| 2012/0224077 | A1* | 9/2012 | Imai | H04N 1/00167 348/222.1 |

* cited by examiner

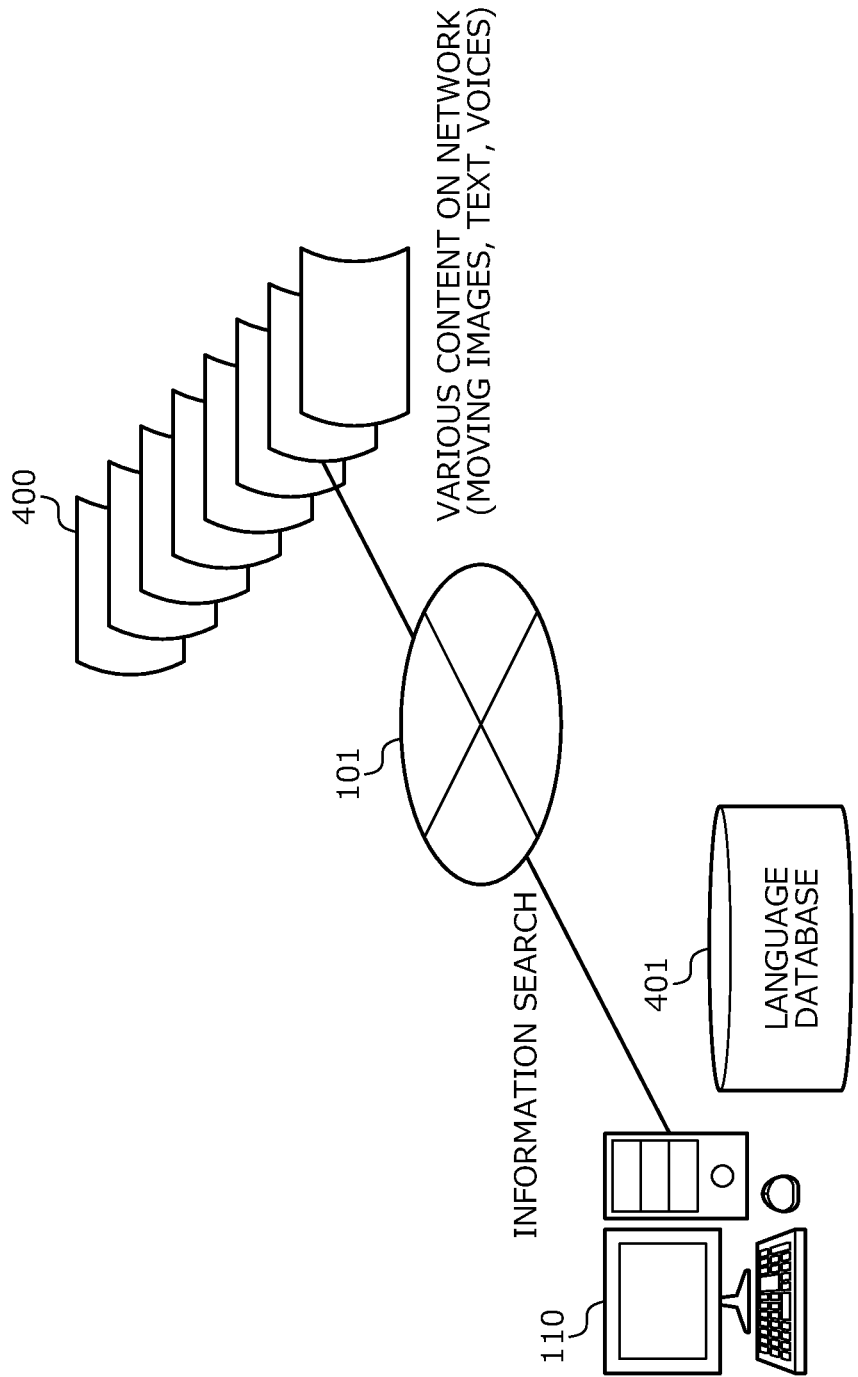

FIG.4B

| TYPE | SEARCH SUITABILITY | MAIN SEARCH TARGET | SPECIFICATION METHOD |
|---|---|---|---|
| MOVING IMAGE | ◎ | MOVING IMAGE, STILL IMAGE | SIGN LANGUAGE MOTION |
| VOICE | ◎ | VOICE | KEYWORD |
| EMPHASIZING MOTION | △ | MOVING IMAGE, STILL IMAGE | SIGN LANGUAGE MOTION |
| MOVEMENT OF LIPS | ○ | MOVING IMAGE, STILL IMAGE | CLOSEUP MOVING IMAGE OF LIPS |
| FACIAL EXPRESSION | ○ | MOVING IMAGE, STILL IMAGE | HAPPY, ANGRY, SAD, COMFORTABLE, EMOTIONLESS |
| POSTURE | △ | MOVING IMAGE, STILL IMAGE | SIGN LANGUAGE MOTION |
| TEXT | ◎ | TEXT | KEYWORD |

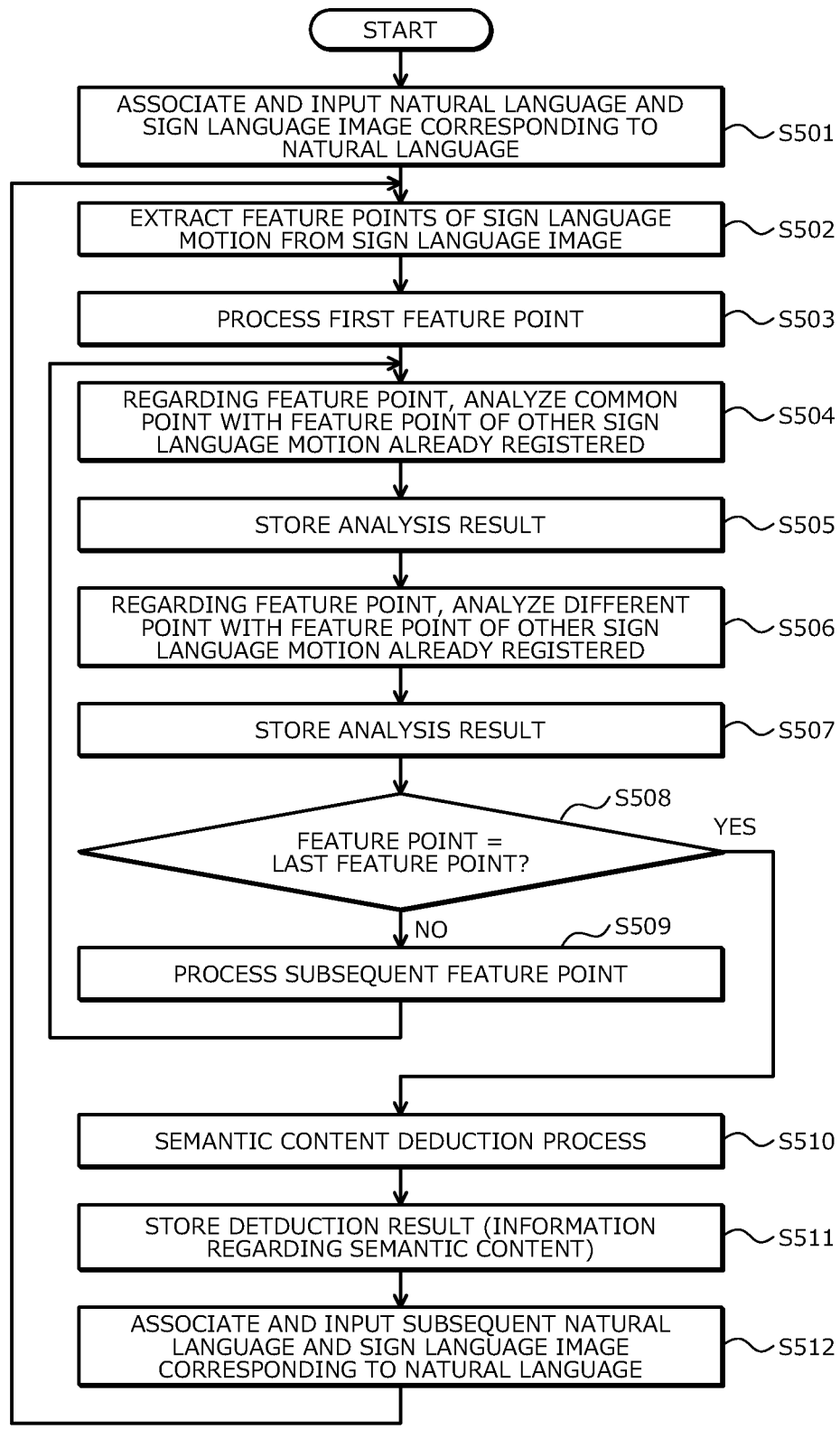

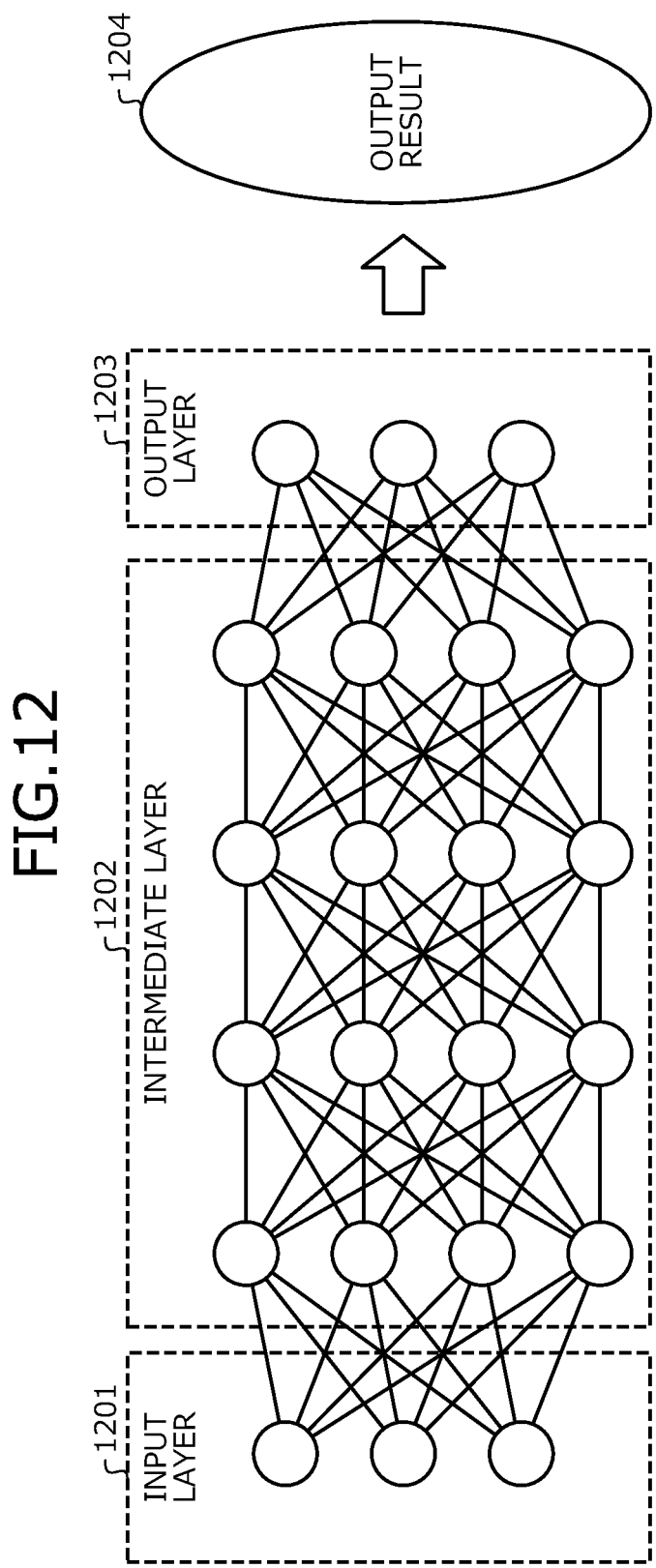

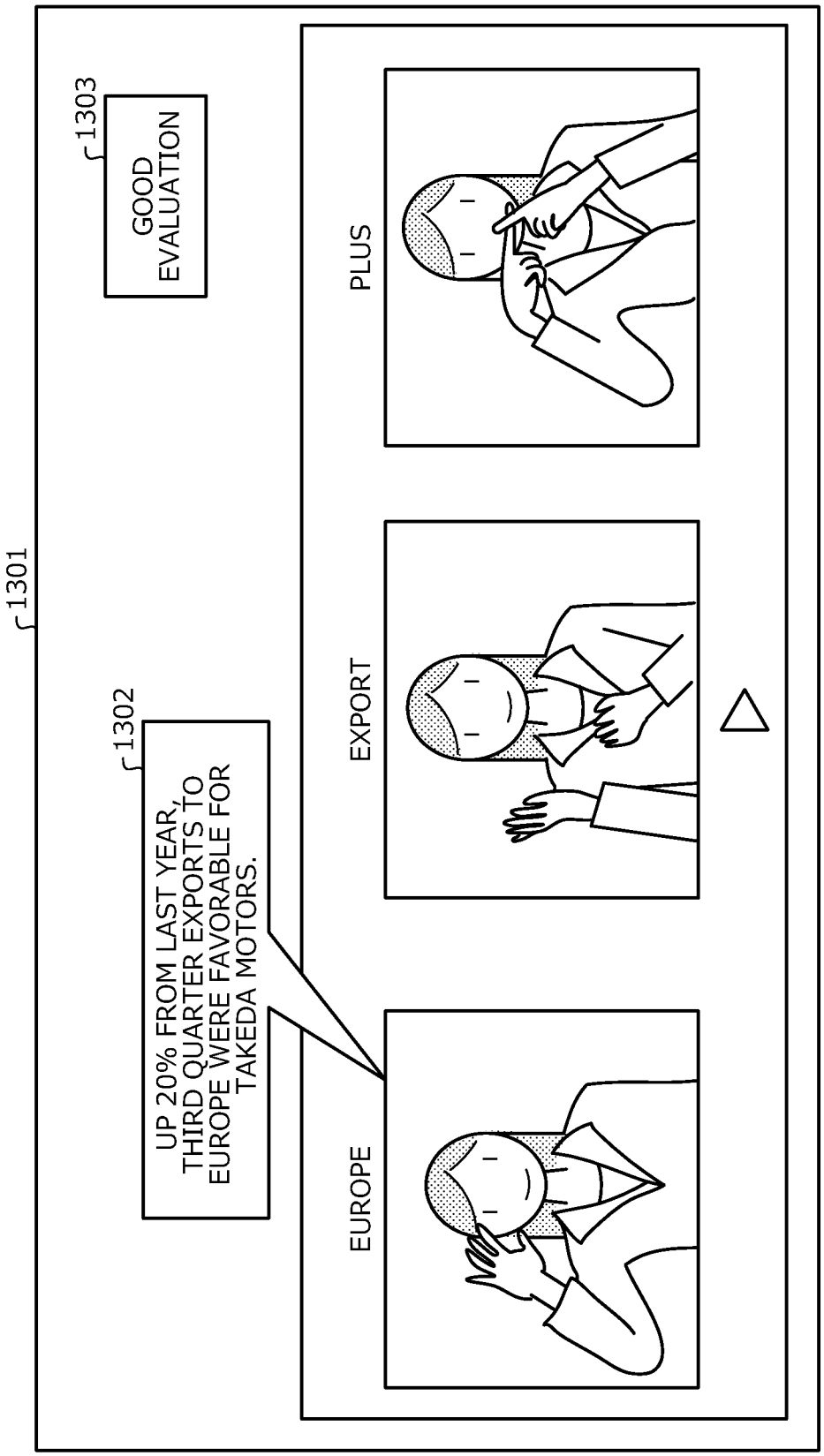

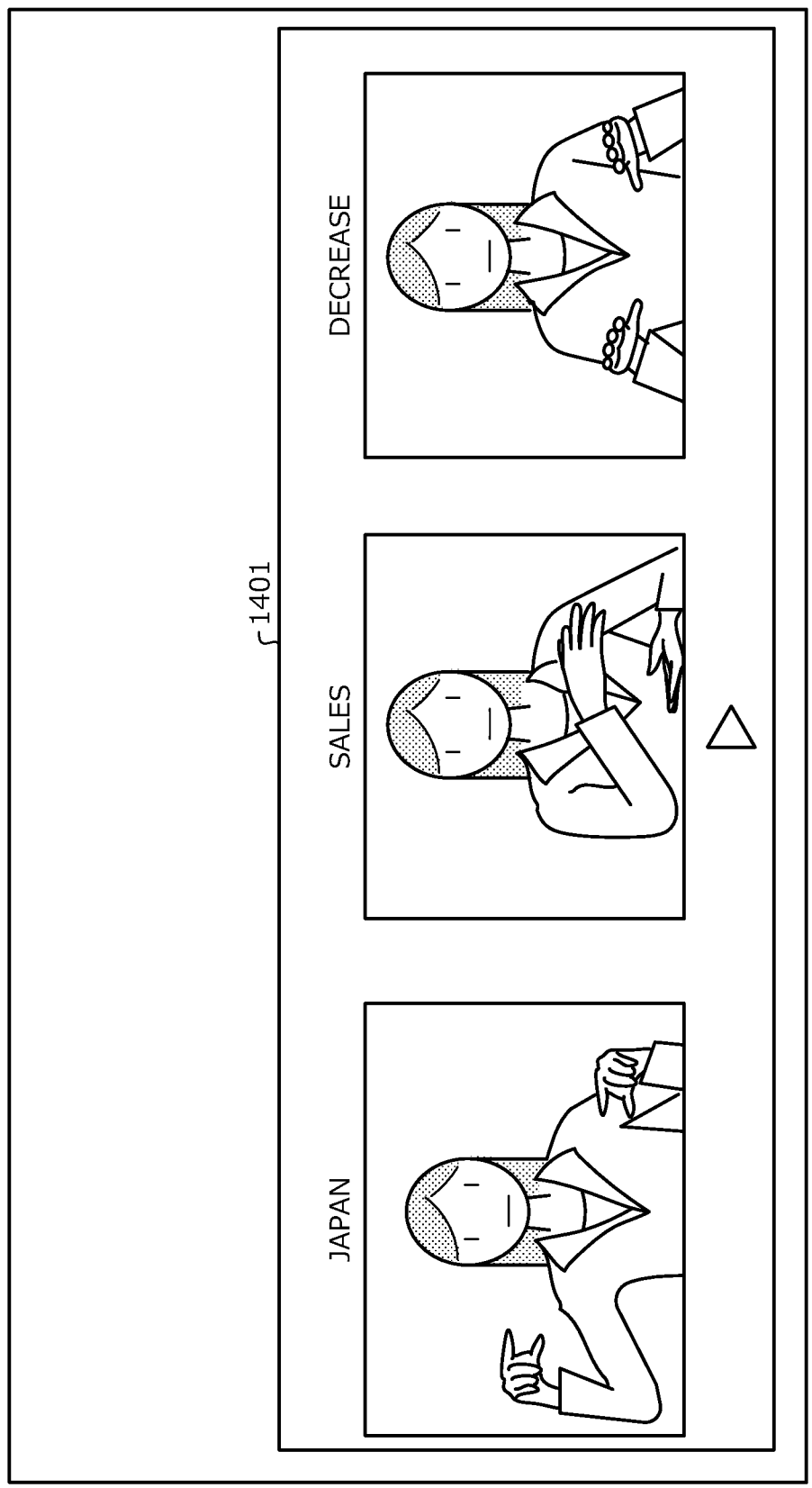

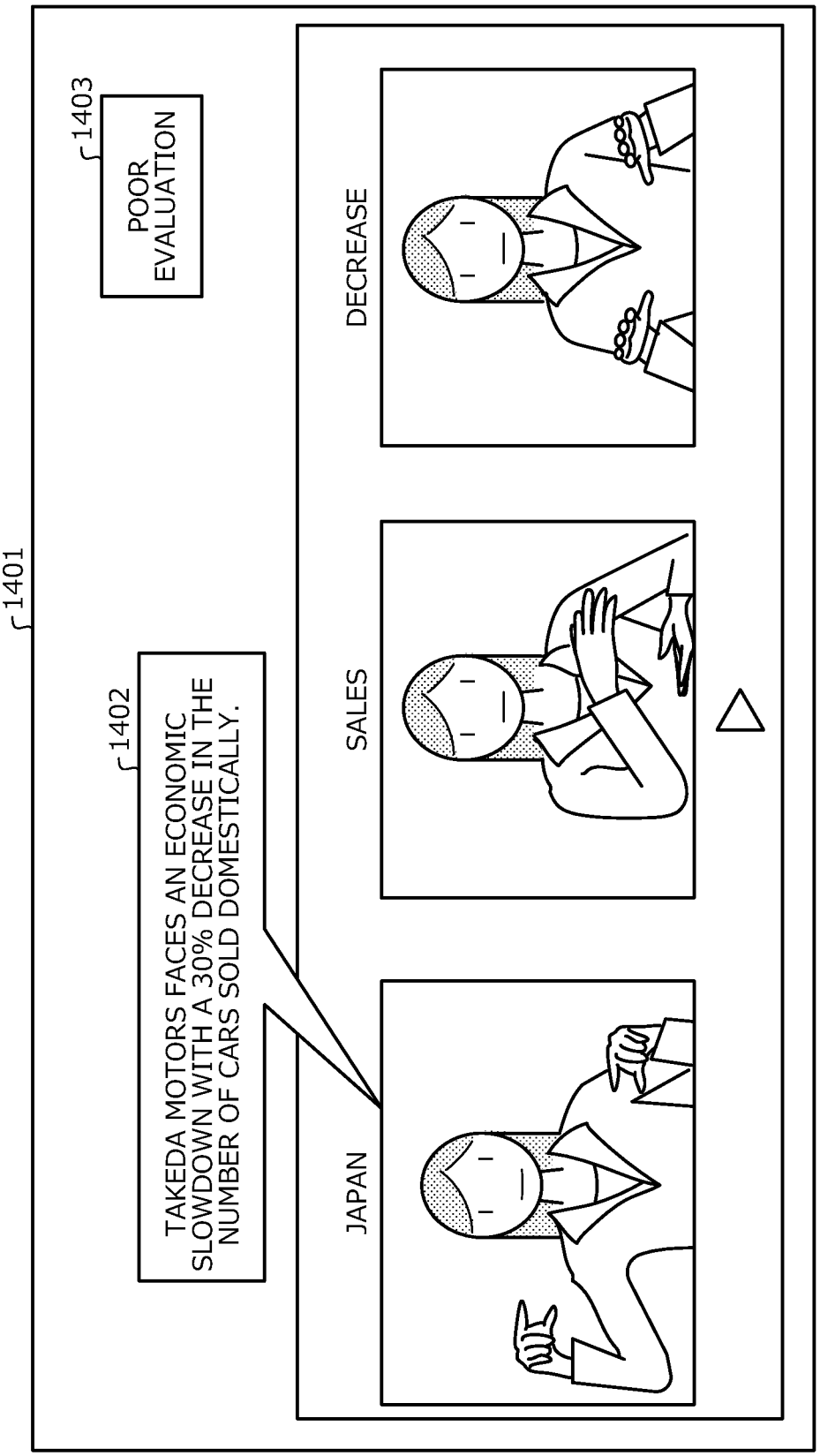

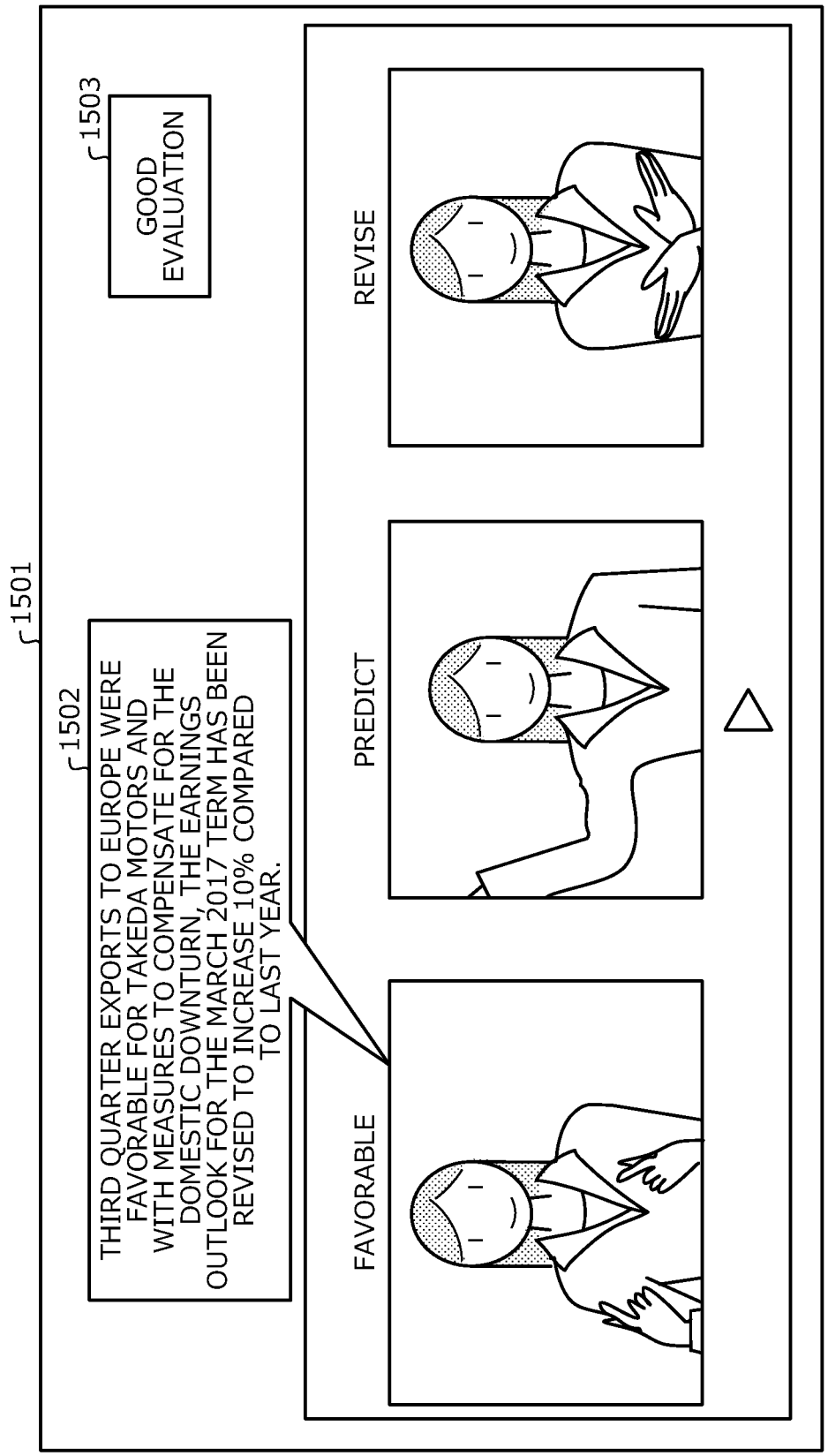

NATURAL LANGUAGE PROCESSING APPARATUS, NATURAL LANGUAGE PROCESSING METHOD, AND RECORDING MEDIUM FOR DEDUCING SEMANTIC CONTENT OF NATURAL LANGUAGE ELEMENTS BASED ON SIGN LANGUAGE MOTION

CROSS REFERENCE TO RELATED APPLICATIONS

This application is based upon and claims the benefit of priority of the prior Japanese Patent Application No. 2016-200483, filed on Oct. 11, 2016, the entire contents of which are incorporated herein by reference.

BACKGROUND OF THE INVENTION

1. Field of the Invention

Embodiments of the present invention relate to a natural language processing apparatus, a natural language processing method, and a recording medium.

2. Description of the Related Art

Techniques of image recognition using machine learning according to artificial intelligence (AI) algorithms have recently achieved a dramatic improvement in recognition accuracy because of techniques such as neural networks and deep learning, and the recognition accuracy is said to be at a level exceeding human ability.

For example, similar to the so-called "Google cat", a computer may learn through unsupervised learning from an enormous number of images to discover the existence of a cat, identify the appearance, and distinguish the cat itself. Drastic developments have also recently been made in techniques, that may be put into practical use, related to automated driving vehicles using artificial intelligence algorithms.

SUMMARY OF THE INVENTION

According to one aspect of the present invention, a natural language processing apparatus configured to analyze a plurality of natural language elements, includes processing circuitry configured to input, for each natural language element, multiple sign language images for a certain natural language element together with the natural language, extract multiple feature points of a first sign language motion from the input sign language images and analyze a common point or a differing point between the first sign language motion and a second sign language motion, for each of the extracted feature points, deduce semantic content of the natural language element from the analyzed common point or the differing point, and a storage configured to store in association with the natural language element, information regarding the deduced semantic content. The processing circuitry analyzes the natural language using an artificial intelligence algorithm.

Objects, features, and advantages of the present invention are specifically set forth in or will become apparent from the following detailed description of the invention when read in conjunction with the accompanying drawings.

BRIEF DESCRIPTION OF THE DRAWINGS

FIG. 4A is an explanatory diagram of an example of network configuration of the natural language processing apparatus of the embodiment according to the present invention;

FIG. 4B is an explanatory diagram of an example of details of a multi-search key that may be appended to the sign language image;

FIG. 5 is a flowchart of overall processing procedures of the natural language processing apparatus of the embodiment according to the present invention;

FIGS. 10A, 10B, 100, 10D, 10E, 10F, and 10G are explanatory diagrams of examples of sign language motions for the natural language "hot";

FIGS. 11A, 11B, 110, 11D, 11E, 11F, and 11G are explanatory diagrams of examples of sign language motions for the natural language "love";

FIG. 12 is an explanatory diagram of configuration of a neural network of the natural language processing apparatus of the embodiment according to the present invention; and FIGS. 13A, 13B, 14A, 14B, 15A, and 15B are explanatory diagrams of contents of an application example of the embodiment according to the present invention.

DETAILED DESCRIPTION OF THE INVENTION

A natural language processing apparatus, a natural language processing method, and a natural language processing program according to the present invention will be described in detail with reference to the accompanying drawings.

However, first, problems related to the conventional techniques described above will be discussed. The conventional techniques are in the field of image recognition technology, and natural language understanding using device learning through an artificial intelligence algorithm. These techniques have a problem in that the level of implementation still cannot be reached in translation, conversation, etc. The artificial intelligence algorithm is poor at natural language processing, for example, for the following reasons.

Firstly, since language sequence is dependent and the meaning changes depending on the order of words, the permutations and combinations must be taken into consideration, resulting in an enormous amount of calculation. Secondly, the artificial intelligence algorithm cannot understand the meaning of words in the first place and recognition is limited to recognition as a character string. Thirdly, the meaning of words is not easily understood, hence the artificial intelligence algorithm has to judge based on the number of occurrences of words and similarity.

Fourthly, as compared to nouns and verbs, adjectives and abstract concepts are difficult to express with images, and it is also difficult to combine character strings and images. Fifthly, since the artificial intelligence algorithm does not understand the meaning and cannot easily understand the relationship of words such as antonyms, synonyms, and homonyms, the artificial intelligence algorithm is poor at natural language processing.

Figure 1:
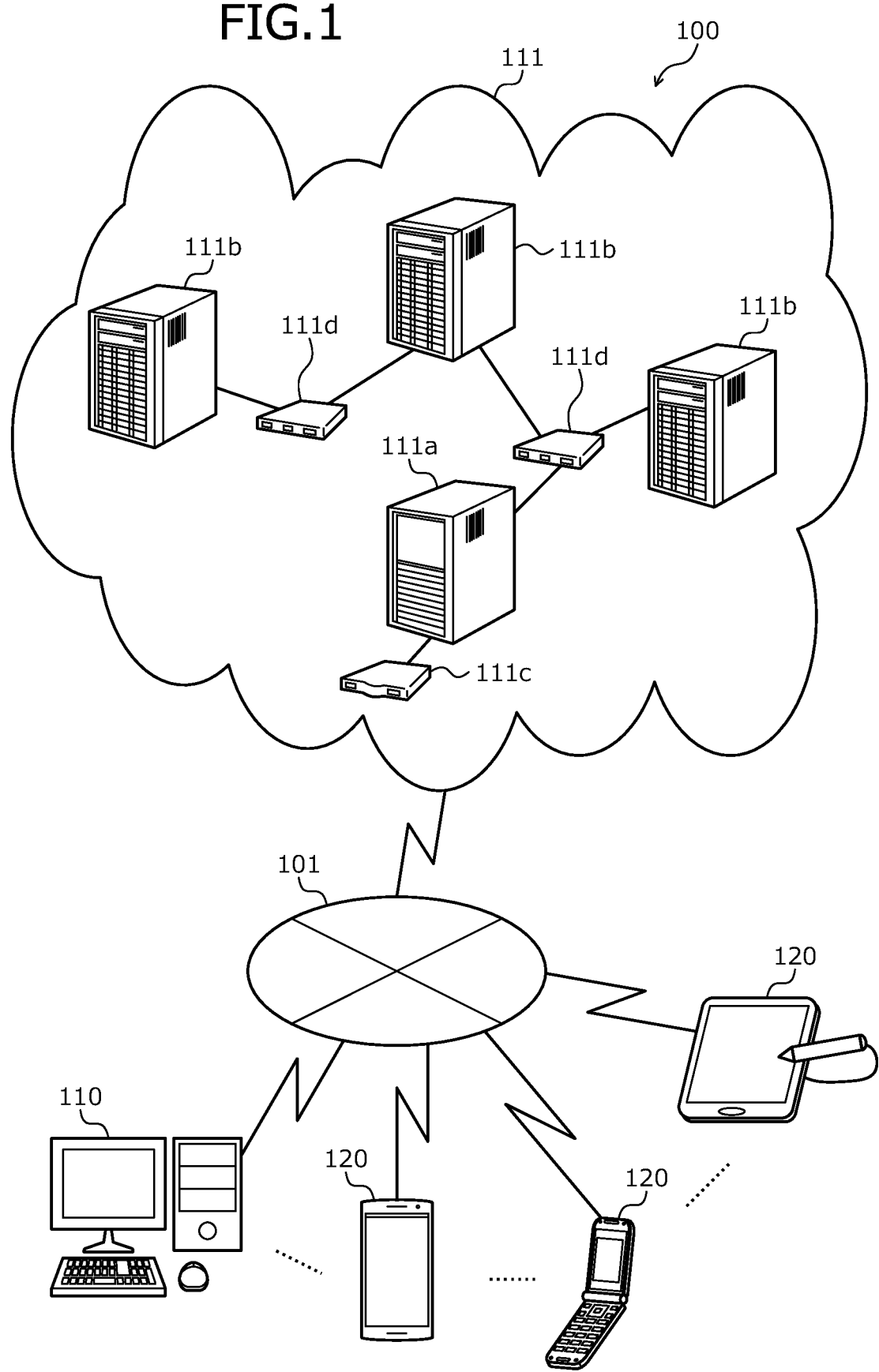
FIG. 1 is an explanatory diagram of system configuration of a natural language processing system including a natural language processing apparatus of an embodiment according to the present invention.

Here, a system configuration of a natural language processing system including a natural language processing apparatus of an embodiment according to the present invention will be described. FIG. 1 is an explanatory diagram of the system configuration of the natural language processing system including the natural language processing apparatus of the embodiment according to the present invention.

Figure 2:
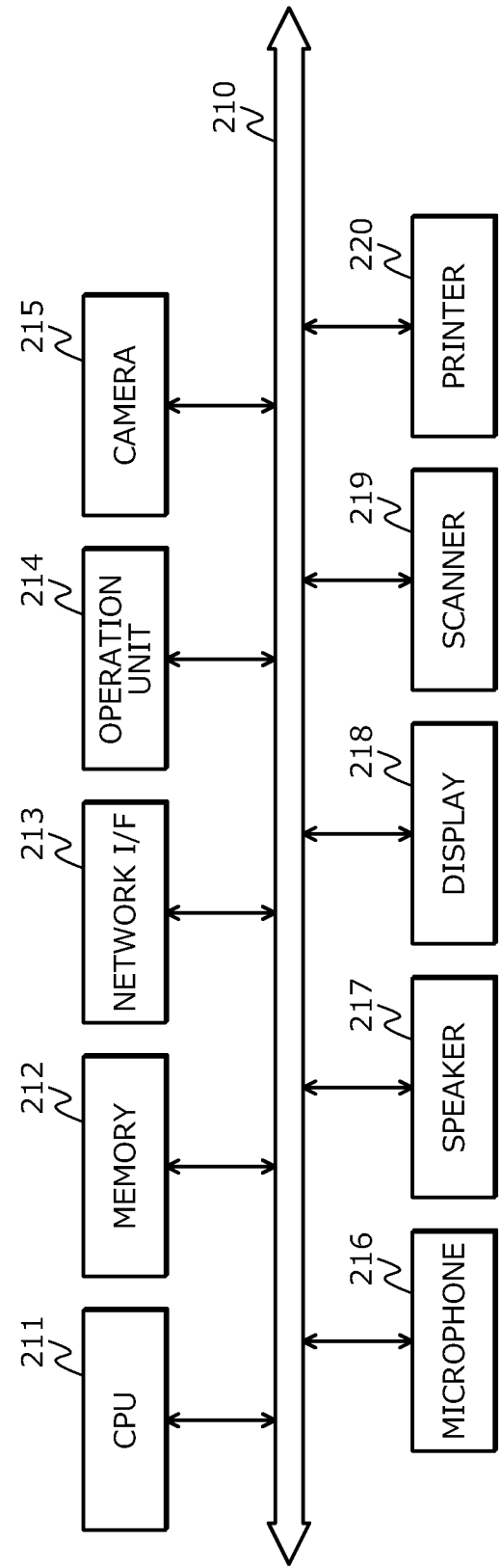
FIG. 2 is an explanatory diagram of an example of hardware configuration of the natural language processing apparatus of the embodiment according to the present invention.
Figure 3:
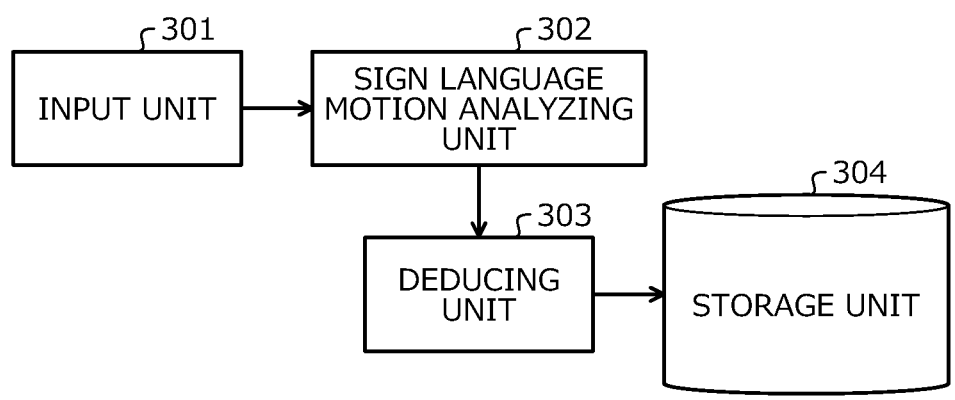
FIG. 3 is an explanatory diagram of an example of functional configuration of the natural language processing apparatus of the embodiment according to the present invention.

In FIG. 1, a natural language processing system 100 may be implemented by, for example, a computer apparatus 110 managed by an administrator of the natural language processing apparatus (see FIGS. 2 and 3). In this case, a network 101, such as the Internet, having the natural language processing apparatus connected thereto includes the natural language processing apparatus implemented by the computer apparatus 110 and various terminal apparatuses 120. The computer apparatus 110 implementing the natural language processing apparatus and the various terminal apparatuses 120 are communicably connected to each other through the network 101.

The natural language processing apparatus is not limited to those implemented by the single computer apparatus 110 and may be implemented by a cloud system 111 using the computer apparatus 110 as an administrative terminal.

When the natural language processing apparatus is implemented by the cloud system 111, the cloud system 111 is made up of multiple resources such as the computer apparatus 110 implementing the administrative terminal, a resource management apparatus 111a, a storage apparatus 111b, a router 111c, and a switch 111d. In the cloud system 111, the resource management apparatus 111a and the storage apparatus 111b may be connected through the network 101 to each other.

The resource management apparatus 111a is connected through the network 101 to the computer apparatus 110 implementing the administrative terminal. The computer apparatus 110 implementing the administrative terminal may be implemented by a general-purpose computer apparatus (see FIGS. 2 and 3) and is operated by the administrator, etc.

In response to a request from the computer apparatus 110 implementing the administrative terminal, the resource management apparatus 111a builds a system satisfying the user request by using resources, selected from resources such as the storage apparatus 111b, and may execute a process corresponding to the user request with the built system.

The resource management apparatus 111a may be implemented by, for example, a computer apparatus controlling the storage apparatus 111b. The storage apparatus 111b is constituted by a recording medium retaining data, a drive that reads and/or writes information with respect to the recording medium, etc.

The recording medium in the storage apparatus 111b may be implemented by, for example, a magnetic disk such as a hard disk, an optical disk such as a CD, a DVD, and a Blu-ray disk, a flash memory storage apparatus such as a USB memory, a memory card, and a solid state drive (SSD), and a magnetic tape. Blu-ray is a registered trademark.

The various terminal apparatuses 120 may be implemented by computer apparatuses used by users such as a personal computer (PC), a notebook PC, a smartphone, a tablet terminal, and a portable telephone. The various terminal apparatuses 120 may be wirelessly connected or wired to the network 101.

An example of hardware configuration of the natural language processing apparatus of the embodiment according to the present invention will be described. FIG. 2 is an explanatory diagram of an example of hardware configuration of the natural language processing apparatus of the embodiment according to the present invention.

In FIG. 2, the computer apparatus 110 implementing the natural language processing apparatus (or the administrative terminal) of the embodiment according to the present invention includes a central processing unit (CPU) 211, a memory 212, a network interface (I/F) 213, an operation unit 214 (an I/O device), a camera 215, a microphone 216, a speaker 217, a display 218, a scanner 219, and a printer 220. The components 211 to 220 included in the computer apparatus 110 are connected to each other through a bus 210.

The CPU 211 is responsible for the overall control of the computer apparatus 110. The memory 212 stores programs such as a boot program and data constituting various databases. The memory 212 also stores various programs and data related to natural language processing, such as a natural language processing program of the embodiment according to the present invention and various databases related to execution of the natural language processing program.

The memory 212 is used as a work area of the CPU 211. The memory 212 may be implemented by a read-only memory (ROM), a random access memory (RAM), a hard disk drive (HDD), and a hard disk (HD), for example.

The network I/F 213 is connected to the network 101 and controls the input and output of data between the computer apparatus 110 and external apparatuses. In particular, the network I/F 213 is responsible for interface between the computer apparatus 110 and the external apparatuses such as the various terminal apparatuses 120.

The operation unit 214 includes keys for inputting characters, numerical values, various instructions, etc., and performs data input. The operation unit 214 may be implemented by a touch panel and a keyboard, for example. The operation unit 214 implemented by a touch panel, a keyboard, etc. outputs to the CPU 211, a signal according to the input operation to the operation unit 214.

When the operation unit 214 is implemented by a touch panel, the touch panel is laminated on the display surface side of the display 218. When detecting contact with a writing instrument such as a finger, a pen, etc., the touch panel outputs an electrical signal according to the position of contact of the writing member with the touch panel. For the touch panel, various known systems may be used, including a resistive film system, an electrostatic capacity system, an acoustic pulse recognition system, an ultrasonic surface acoustic wave system, an infrared blocking system, an image recognition system, etc.

The camera 215 is controlled by the CPU 211 to capture an image of an object and generate image data. The image data may be a still image or a moving image. For example, when a user performs a predetermined input operation on the operation unit 214, the camera 215 captures an image of a sign language signer, etc. located in the imaging range of the camera 215. The image data generated by the camera 215 is output to the CPU 211.

The microphone 216 performs analog-to-digital conversion of a voice of a speaker input as analog data and generates audio data in a digital format. Since the microphone 216 is provided, the computer apparatus 110 implementing the natural language processing apparatus (or the administrative terminal) may receive input of a voice together with the sign language image of the sign language signer. The microphone 216 may be in a form positionally fixed to the natural language processing apparatus or may be in a form wirelessly connected or wired to a main body of the natural language processing apparatus so that the microphone may be brought close to the mouth of the sign language signer, etc. when used.

For example, the speaker 217 performs digital-to-analog conversion of digital audio data for guiding operation procedures and outputs sound by energizing a coil in a speaker cone based on the analog audio data. The microphone 216 and the speaker 217 may be integrated like a receiver of a telephone.

The display 218 displays a sign language image, etc. The display 218 may be implemented mainly by using a liquid crystal display or an organic electro-luminescence (EL) display, for example.

In particular, for example, the display 218, implemented by a liquid crystal panel, is formed by sandwiching a liquid crystal material (liquid crystal molecules) between a pair of glass substrates into which transparent electrodes are incorporated and providing a polarizing filter on the glass substrates. The liquid crystal panel changes the orientation of the liquid crystal molecules by applying voltage to the electrodes and thereby controls the state of light passing through the glass substrates. The liquid crystal panel further includes a backlight as a light source. This light source may illuminate an image displayed by the liquid crystal molecules that do not emit light themselves.

The scanner 219 includes a contact glass, an exposure lamp, a reflecting mirror, an imaging lens, a solid-state imaging device, etc. A document to be read is placed on the contact glass. For example, a sign language image and an image to be input together with a sign language image are drawn on the document. The image to be input together with a sign language image may be, for example, an image of the sun suggestive of "hot" or an image of a snow scene suggestive of "cold", etc., or may be an image of a pan put over a fire suggestive of "heat" or an image of a container containing ice suggestive of "coolness".

The exposure lamp applies a scanning light to the document on the contact glass. The reflecting mirror guides light reflected from the document to the imaging lens. The imaging lens makes the light reflected by the reflecting mirror incident on the solid-state imaging device. For example, the solid-state imaging device may be implemented by a three-line CCD image sensor array having charge-coupled device (CCD) image sensors, which are one-dimensional solid-state imaging devices, arranged in three lines for three colors of RGB.

For the solid-state imaging device, MOS-based image sensors such as complementary metal oxide semiconductors (CMOSs) may be used instead of the CODs. An image signal converted into an electrical signal by the solid-state imaging device is input to the CPU 211.

For example, the printer 220 may issue a predetermined sheet of paper on which analysis results of sign language images, etc. are recorded. The printer 220 issues the predetermined sheet of paper by executing a recording process for recording contents of payment, etc. on the predetermined sheet of paper. The printer 220 may be implemented by a printer using various known printing methods such as a laser printer and an inkjet printer.

An example of functional configuration of the natural language processing apparatus of the embodiment according to the present invention will be described. FIG. 3 is an explanatory diagram of an example of functional configuration of the natural language processing apparatus of the embodiment according to the present invention.

In FIG. 3, the natural language processing apparatus (the computer apparatus 110 implementing the natural language processing apparatus, the cloud system 111 using the computer apparatus 110 as the administrative terminal) of the embodiment according to the present invention includes at least an input unit 301, a sign language motion analyzing unit 302, a deducing unit 303, and a storage unit 304 the functions of each of which are implemented by processing circuitry of the natural language processing apparatus.

The input unit 301 inputs, for each natural language element, multiple sign language images for a certain natural language element together with the natural language element. The natural language element may be a word or a series of sentences. Each of the sign language images is an image related to a sign language motion performed by a sign language signer for the natural language element. The sign language image may be a still image or a moving image. In the case of a still image, the image may be made up of multiple still images so that a start, an intermediate portion, an end, etc. of the motion may be known and so that the contents of the sign language motion may be understood.

For example, a function of the input unit 301 may be implemented by the processing circuitry together with, for example, the network I/F 213, the operation unit 214, the camera 215, the microphone 216, and the scanner 219 depicted in FIG. 2.

The sign language motion analyzing unit 302 extracts multiple feature points of a sign language motion from a sign language image input by the input unit 301. The sign language motion in this case is a motion including a shape of the hand, a position of the hand, a movement of the hand, etc., and the feature points indicate the characteristic portions of these operations. For example, a function of the sign language motion analyzing unit 302 may be implemented by the processing circuitry which includes the CPU 211 etc. included in the computer apparatus 110 depicted in FIG. 2.

The sign language motion analyzing unit 302 may extract a feature point of a sign language motion for each of multiple classified "handshapes" from the sign language image input by the input unit 301. The "handshapes" are classified shapes of the hand and, for example, according to Takemura, S. "Syuwa-Nihongo Daijiten (Sign language-Japanese Dictionary)" (Kosaido Publishing, 1999), 59 types exist based on fingerspelling. Details of the "handshapes" will be described later with reference to FIGS. 6A to 6L.

The sign language motion analyzing unit 302 may classify the sign language images input by the input unit 301 into "one-handed sign", "two-handed same-shape sign", and "two-handed different-shape sign" and extract a feature point of the sign language motion for each of the respective classified signs.

The "one-handed sign" is a one-handed sign that is a sign expressed by one hand, the "two-handed same-shape sign" is a sign expressed by two hands both forming the same shape (see FIGS. 8A to 8F described later), and the "two-hand different-shape sign" is a sign expressed by two hands each forming a different shape (see FIGS. 9A and 9B described later).

The sign language motion analyzing unit 302 analyzes a common point or a differing point between a sign language motion and another sign language motion for each of the extracted feature points. For the analyzed common or differing point, a feature amount is calculated (quantified) in terms of the extent of similarity or dissimilarity. The feature amount may be included in the information regarding the feature point.

The sign language motion analyzing unit 302 may compare sign language motions for each "handshape" to analyze the common point or the differing point with respect to another sign language motion. Alternatively, the sign language motion analyzing unit 302 may make a comparison for each of the extracted feature points between respective sign language motions classified into the "one-handed sign", the "two-handed same-shape sign", and the "two-handed different-shape sign" to analyze the common or differing point with respect to another sign language motion. How the feature points of sign language are compared and how the common point or the differing point is analyzed may be sorted out by a computer through machine learning.

The sign language motion analyzing unit 302 may extract feature points related to "non-hand/finger motion" in addition to or instead of the sign language motion from the sign language images input by the input unit 301 to analyze a common point or a differing point between a first sign language motion and a second sign language motion, for each of the extracted feature points. The "non-hand/finger motion" is an element other than hand movement such as a facial expression of a sign language signer, posture of a sign language signer, etc.

The deducing unit 303 deduces semantic content of a natural language element from the common point or the differing point analyzed by the sign language motion analyzing unit 302. For example, based on the feature amount of the analyzed common or differing point, the semantic content of the language may be determined or, for example, a classification of multiple semantic contents may be made in advance to determine in which semantic content category the language is included. For example, a function of the deducing unit 303 may be implemented by the processing circuitry including the CPU 211, etc. included in the computer apparatus 110 depicted in FIG. 2.

The deducing unit 303 deduces the semantic content of the natural language element from a meaning of a handshape or movement of a sign language motion. With regard to the meaning of a handshape or movement of a sign language motion, for example, a "handshape" depicted in FIG. 6A described later represents a Japanese character "ソ", a "handshape" depicted in FIG. 6B represents a Japanese character "ヒ"; a "handshape" depicted in FIG. 6D represents a Japanese character "サ"; a "handshape" depicted in FIG. 6I represents a Japanese character "え", a "handshape" depicted in FIG. 6J represents a Japanese character "タ", a "handshape" depicted in FIG. 6K represents a Japanese character "フ"; a "handshape" depicted in FIG. 6L represents a Japanese character "モ"; and a "handshape" depicted in FIG. 6H represents "C". In FIGS. 11D and 11F described later, a sign language motion represents "love" with a shape of a "heart". Such information is used for deducing the semantic content of the natural language element.

The input unit 301 may input a "related image" suggestive of the natural language element, in association with the natural language element and the sign language image. The deducing unit 303 may use the related image (e.g., a video of the sun glaring followed by a person wiping away perspiration for the natural language "hot") to deduce the semantic content of the natural language element. Details of the "related images" will be described later.

The storage unit 304 associates and stores information regarding the semantic content deduced by the deducing unit 303 and the natural language element input by the input unit 301. As a result, a natural language database used for analysis of natural language may be built. For example, a function of the storage unit 304 may be implemented by processing circuitry including the CPU 211 and the memory 212 included in the computer apparatus 110 depicted in FIG. 2.

An overview of an Internet search using the natural language processing apparatus will be described. FIG. 4A is an explanatory diagram of an example of network configuration of the natural language processing apparatus of the embodiment according to the present invention. FIG. 4B is an explanatory diagram of an example of details of a multi-search key that may be appended to the sign language image.

In FIG. 4A, the computer apparatus 110 may search for various content (moving images, text, voices, etc.) on the network 101 through the network 101 such as the Internet to acquire the information. Information related to the acquired contents is associated with the language and stored in the storage unit 304 whereby a language database 401 may be built.

Content created by third parties exists in various recording formats. As depicted in FIG. 4B, data stored in the storage unit 304 may include a search key corresponding to multiple recording formats for searching for desired matters to be learned from content in the multiple formats.

For example, in a case in which learning about "FinTech" is to be performed, the feature point of the sign language motion of "FinTech" may be used as a key to search for and acquire a sign language image of another signer signing about "FinTech" so that learning from the sign language image contents may occur. The feature point of the sound of "FinTech" and the text of "FinTech" may be used as a key to search for and acquire audio content and text content, respectively, thereby enabling learning.

The list depicted in FIG. 4B is provided with main search objects as an item such that the main search objects of images, sound, and text are defined as images, sound, and text, respectively; however, this is not a limitation and contents created by third parties may be searched for by using any of the keys as in a case where sound and an image may be searched from text.

The natural language processing apparatus stores, into the data stored in the storage unit 304, a search key for each format of contents existing on the Internet and therefore, without omission, may acquire contents in multiple formats for the machine learning.

Overall processing procedures of the natural language processing apparatus of the embodiment according to the present invention will be described. FIG. 5 is a flowchart of the overall processing procedures of the natural language processing apparatus of the embodiment according to the present invention.

In the flowchart depicted in FIG. 5, first, a natural language element is input into the natural language processing apparatus (the computer apparatus 110), in association with a sign language image of a sign language motion corresponding to the natural language element, i.e., a sign language image of a sign language signer translating the natural language element into a sign language motion (step S501).

Feature points of the sign language motion are then extracted from the sign language image input into the natural language processing apparatus (the computer apparatus 110) (step S502). Since numerous feature points are conceivable in the sign language motion, the feature points must be sorted out in some cases. In such a case, to increase efficiency and speed of processing, portions of the sign language motion extracted as the feature points may be changed for each sign language image based on the contents of the natural language element input in an association therewith. These portions may be determined by using the artificial intelligence algorithm based on a knowledge base acquired through the machine learning.

A first feature point is then processed among the extracted feature points of the sign language motion (step S503). To increase efficiency and speed of processing, the order of feature points processed among the multiple feature points may also be changed for each sign language image. The order may be determined by using the artificial intelligence algorithm based on a knowledge base acquired through the machine learning.

The feature point processed at step S503 is compared with a feature point of a sign language motion of another sign language image already registered in the natural language processing apparatus (the computer apparatus 110) or in another apparatus connected to the natural language processing apparatus (the computer apparatus 110) to analyze a common point between both feature points as a result of the comparison (step S504), and the analysis result is stored (step S505).

Subsequently, the feature point processed at step S503 is compared with a feature point of the sign language motion of the other sign language image already registered in the natural language processing apparatus (the computer apparatus 110) or in the other apparatus connected to the natural language processing apparatus (the computer apparatus 110) to analyze a differing point between both feature points as a result of the comparison (step S506), and the analysis result is stored (step S507).

The order of the analysis process for the common point at step S504 and the analysis process for the differing point at step S506 may be reversed. In other words, the analysis process for the differing point at step S506 may be executed first and the analysis result stored and the analysis process for the common point of step S504 may then be executed and the analysis result stored. The analysis process for the common point at step S504 and the analysis process for the differing point at step S506 may be executed at the same time.

The order of the execution may be changed for each feature point. For each feature point, the analysis process for the common point of step S504 alone may be executed without executing the analysis process for a differing point at step S506. Alternatively, the analysis process for the differing point at step S506 alone may be executed without executing the analysis process for the common point at step S504. With consideration of improved efficiency and speed of processing, these procedures may be determined by using the artificial intelligence algorithm based on a knowledge base acquired through the machine learning.

Subsequently, it is determined whether the feature point for which the analysis result is stored at step S507 is the last feature point (step S508). If the feature point is not the last feature point (step S508: NO), a subsequent feature point is processed (step S509). The procedure returns to step S504 and the operations from step S504 to step S509 are simply repeatedly executed.

When the feature point for which the analysis result is stored at step S507 is the last feature point at step S508 (step S508: YES), a deduction process is executed based on the stored analysis result for the semantic content of the natural language element input in association with the sign language image (step S510).

The deduction process at step S510 is executed based on the analyzed and stored common and differing points of the feature points. Whether to use all the stored common and differing points or only some of the stored common and differing points may be determined by using the artificial intelligence algorithm based on a knowledge base acquired through the machine learning with consideration of improvement in efficiency and speed of processing.

A result of the semantic content deduction process at step S510, i.e., information regarding the semantic content for the natural language element, is stored (step S511). A subsequent natural language element is input into the natural language processing apparatus (the computer apparatus 110), in association with a sign language image of a sign language motion corresponding to the natural language element (step S512) and the procedure returns to step S502.

Subsequently, the operations at steps S502 to S512 are repeatedly executed. In this way, a natural language input process to a natural language database may be executed.

Description will be made of details of the feature point extraction process (step S502 in the flowchart of FIG. 5) executed by the sign language motion analyzing unit 302 to extract feature points of a sign language motion from a sign language image.

The feature points are motions including a shape of the hand, a position of the hand, a movement of the hand, etc. in the sign language motion. For example, the feature points may be extracted from the shape of the hand and the position of the hand by an image processing technique. For the movement of the hand, in the case of still images of the sign language motion, an amount of change in the position of the hand is extracted from multiple still images to deduce the movement of the hand. In the case of a moving image of the sign language motion, the movement of the hand is identified by an image processing technique for a moving image. These are all extracted as the feature points (feature amounts) from the sign language images.

Particularly in the case of a "one-handed sign" performed with one hand, the feature points of the sign language motion may be feature points according to the "handshape", which is the shape of the hand. FIGS. 6A, 6B, 6C, 6D, 6E, 6F, 6G, 6H, 6I, 6J, 6K, and 6L are explanatory diagrams of examples of types of the "handshape" in typical sign language motions.

Figure 6A:
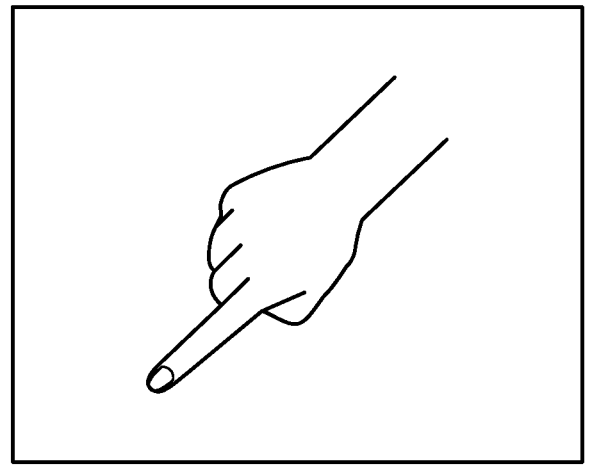
FIGS. 6A, 6B, 6C, 6D, 6E, 6F, 6G, 6H, 6I, 6J, 6K, and 6L are explanatory diagrams of examples of types of a "hand-shape" in typical sign language motions.
Figure 6B:
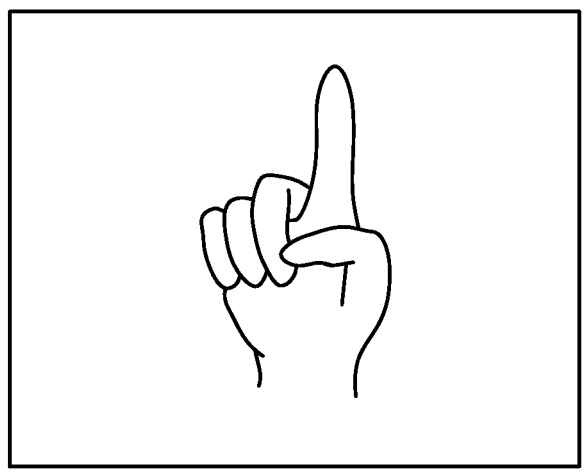
Figure 6C:
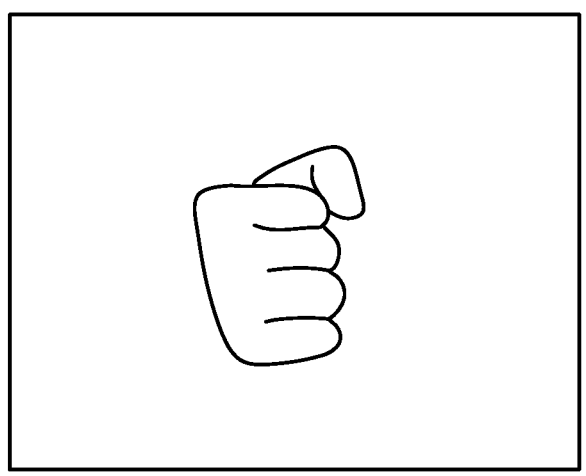
Figure 6D:
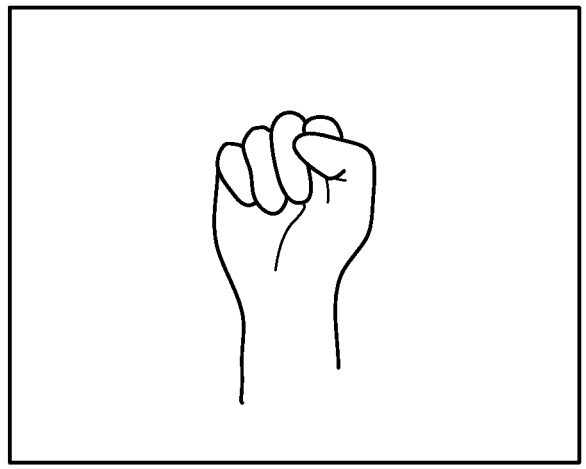
Figure 6E:
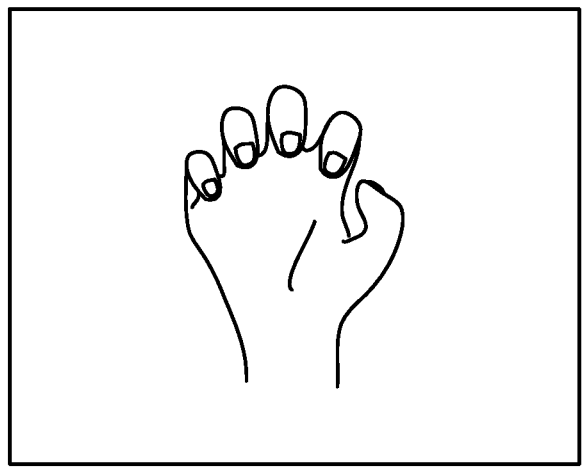
Figure 6F:
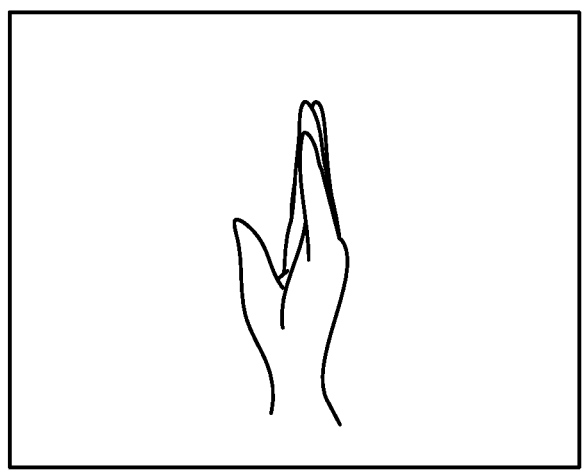
Figure 6G:
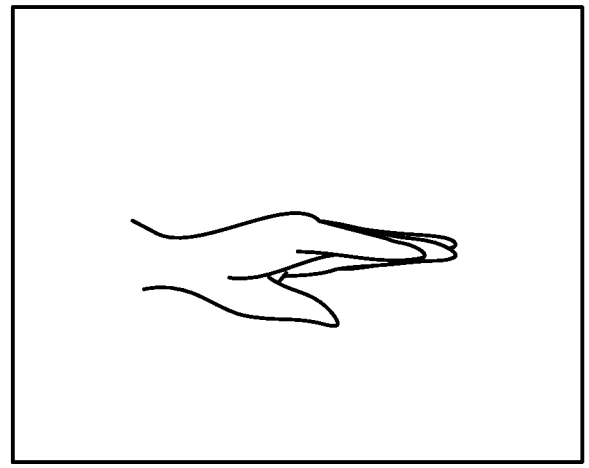
Figure 6H:
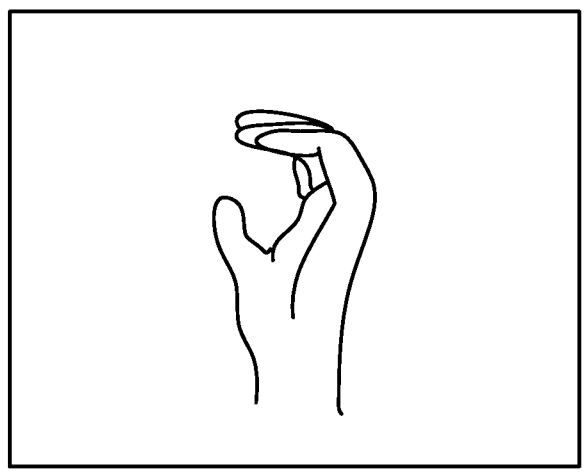
Figure 6I:
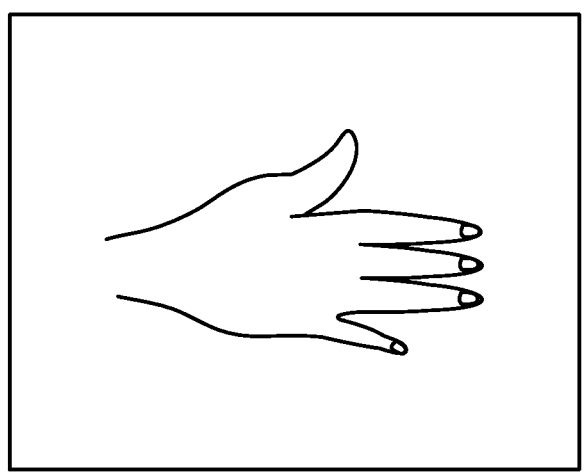
Figure 6J:
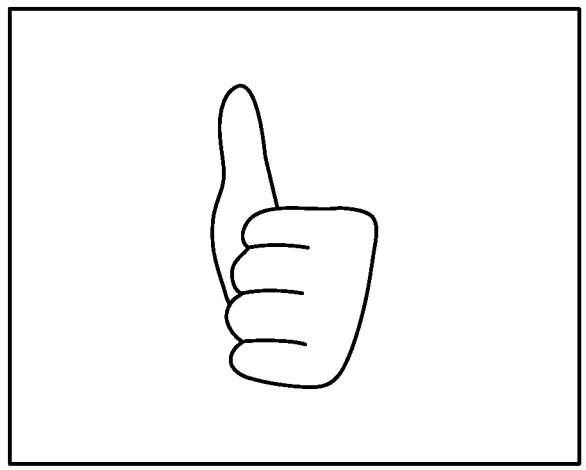
Figure 6K:
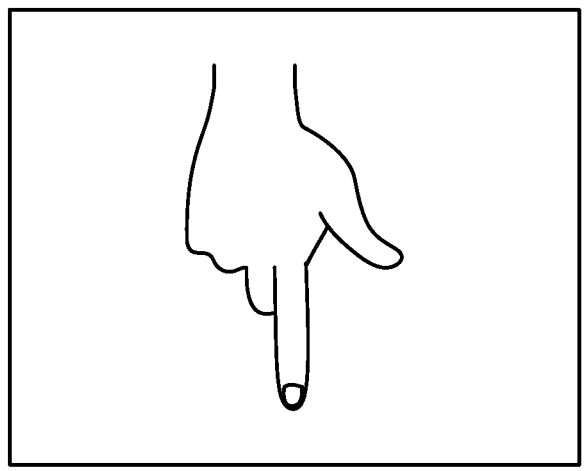
Figure 6L:
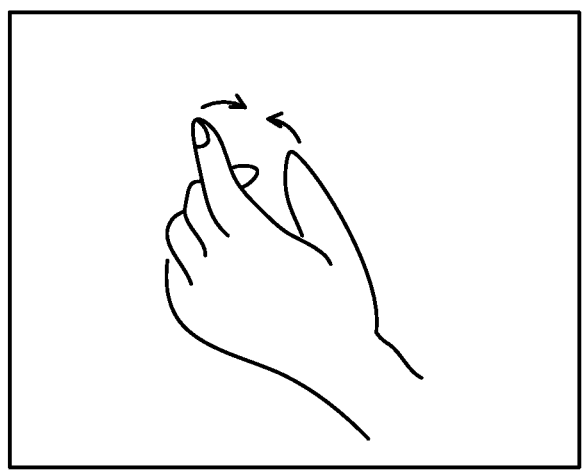

According to "Syuwa-Nihongo Daijiten" cited above, examples of the "handshape" based on fingerspelling in Japanese characters include a "ソ-form" depicted in FIG. 6A, a "ヒ-form" depicted in FIG. 6B, a "リ-form" depicted in FIG. 6D, a "ぅ-form" depicted in FIG. 6I, a "彡-form" depicted in FIG. 6J, a "フ-form" depicted in FIG. 6K, and a "モ-form" depicted in FIG. 6L.

Although not depicted, other examples include a "ハ-form", a "ォ-form", a "ニ-form", a "ウ-form", a "ト-form", a "ぅ-form", a "マ-form", a "ミ-form", a "ユ-form", a "ワ-form", a "ヨ-form", a "オ-form", a "ヿ-form", a "イ-form", a "エ-form", a "カ-form", a "キ-form", a "ク-form", a "コ-form", a "シ-form", a "ス-form", a "セ-form", a "

ㅜ-form", a "ㅑ-form", a "ㅕ-form", a "ㅖ-form", a "ㅗ-form", a "ㅓ-form", a "ㅕ-form", a "ㅣ-form", a "ㅂ-form", a "ㅁ-form", etc.

A "C-form" depicted in FIG. 6H and a "Q-form" not depicted based on alphabet fingerspelling are also included. Examples based on a direction of the index finger include a "index finger backward", a "index finger downward", a "single form", etc., not depicted, and forms achieved by closing and putting out the index finger and the middle finger include a "double upward form", a "double downward" form, etc.

Examples of variations of a first include a "fist vertical" depicted in FIG. 6C, a "fist little" that is a form with the little finger side facing the other party not depicted, a "fist thumb" that is a form with the thumb side facing the other party, a "fist back" that is a form with the backs of fingers facing the other party, and a "fist palm" that is a form with the palm side facing the other party.

Examples of the "handshape" based on the origin of the form include a "rake form" depicted in FIG. 6E, a "prayer type" depicted in FIG. 6F, and a "ㅜ ↓ form" depicted in FIG. 6G, as well as a "narrowing form", a "chopping motion", a "roof form", a "ㅜ ↑ form", a "keyboard form", and a "ring finger", etc. not depicted. All of these "handshapes" may serve as the feature points of the sign language motion.

In the case of the "one-handed sign", a meaning may be determined not only by the "handshape" but also by the position of the hand, i.e., the position of the body part at which the hand is located, so that the position of the hand may be used as a feature point. FIGS. 7A, 7B, 7C, 7D, 7E, and 7F are explanatory diagrams of examples of the position of the hand of the one-handed sign in general sign language motions.

Figure 7A:
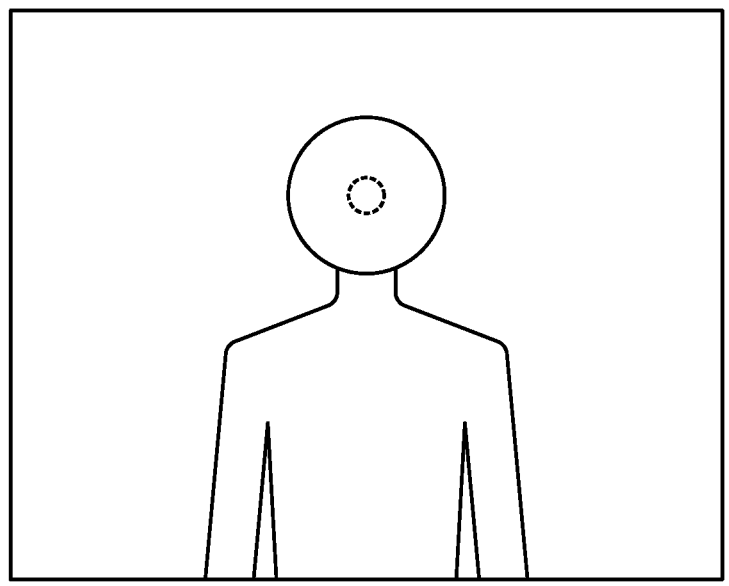
FIGS. 7A, 7B, 7C, 7D, 7E, and 7F are explanatory diagrams of examples of a position of a hand of a one-handed sign in general sign language motions.
Figure 7B:
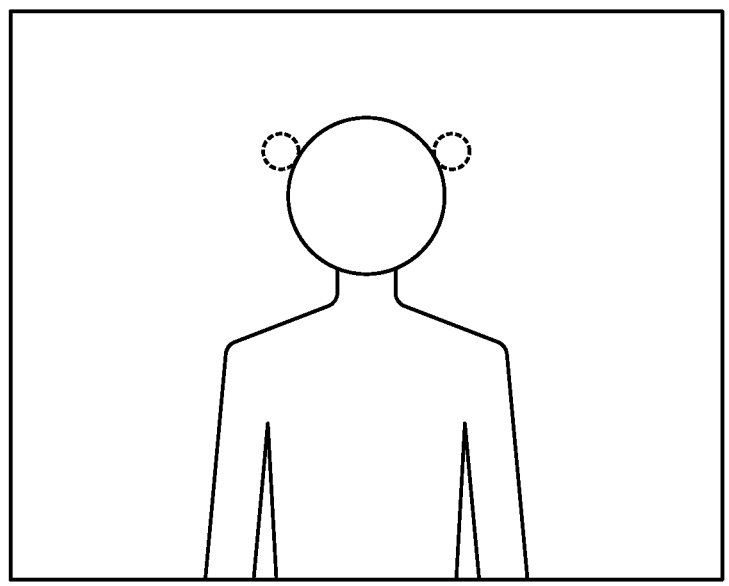
Figure 7C:
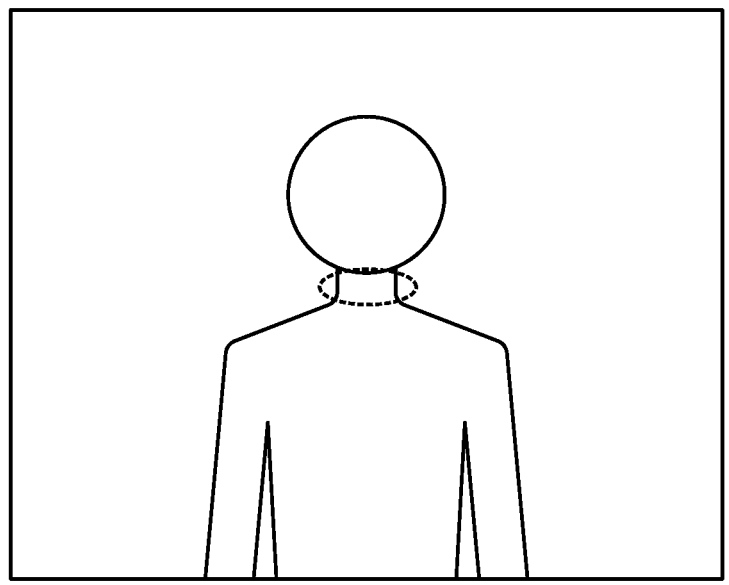
Figure 7D:
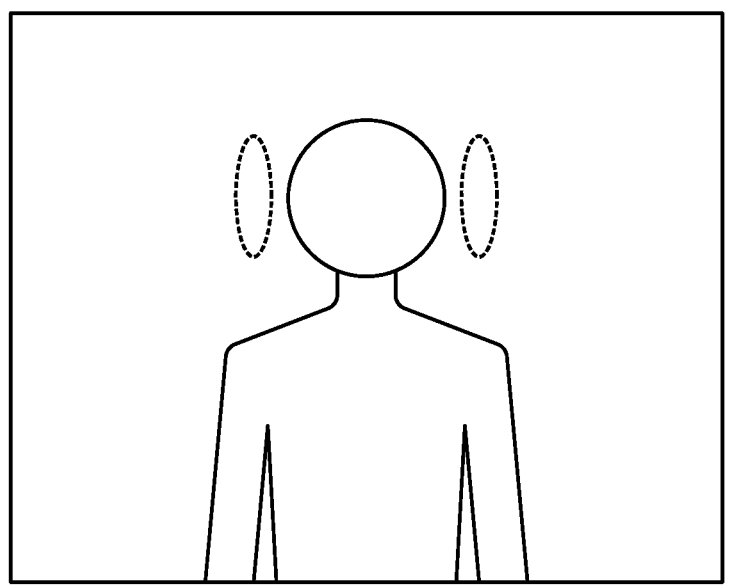
Figure 7E:
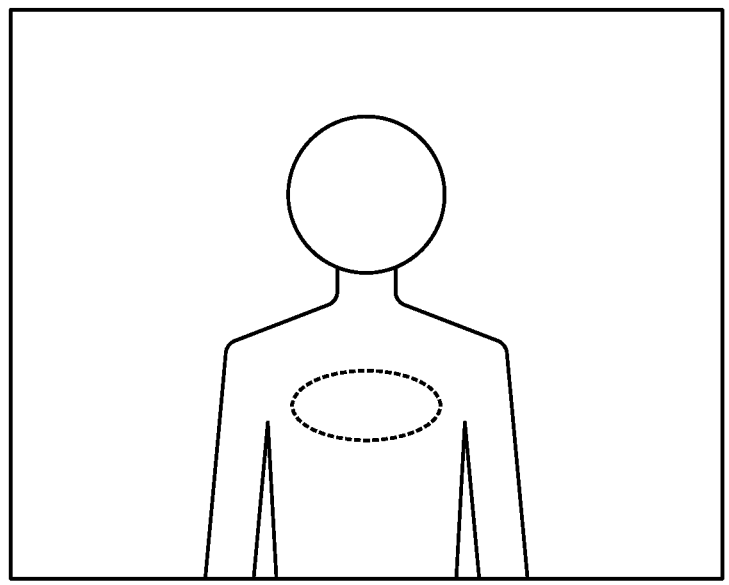

For example, when the position of the hand is in contact with the "nose" or close to the "nose" as depicted in FIG. 7A, when the position of the hand is in contact with the "temple" or close to the "temple" as depicted in FIG. 7B, when the position of the hand is in contact with the "neck" or close to the "neck" as depicted in FIG. 7C, or when the position of the hand is in contact with the "chest" or close to the "chest" as depicted in FIG. 7D, the respective positions may have unique meanings such as occupying the body part.

Although not depicted, other examples include positions in contact with or close to the "head", "forehead", "ear", "eye", "cheek", "mouth", "jaw", "throat", "shoulder", "abdomen", "feet", etc.

Figure 7F:
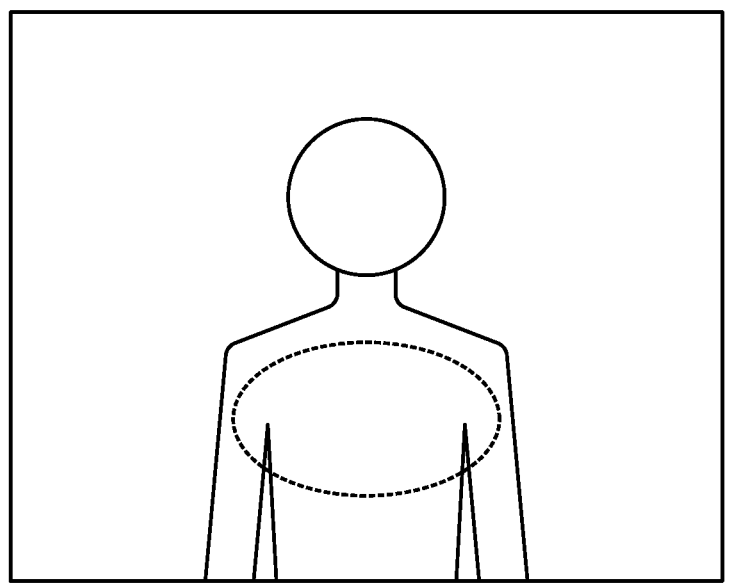

The hand is in the vicinity of a body part, although not in contact therewith, represents another meaning and therefore, may be considered as a feature point. Examples include a case of the hand "next to the head", i.e., at the side of the head and slightly away from the head as depicted in FIG. 7D, the hand "in front of the chest", i.e., at the front side of the chest and slightly away from the chest as depicted in FIG. 7F, etc.

Although not depicted, other cases such as the hand located at positions such as "above the head", "in front of the face", "in front of the abdomen", "at the side of the body", etc., may be used as the feature points.

In the case of the "two-handed same-shape sign", how the two hands move may also be used as a feature point in addition to the "handshape". For example, "up-and-down movement", "back-and-forth movement", "movement in situ", "right-and-left movement", "circular movement", "no movement", etc. of both hands may be used as the feature points.

Figure 8A:
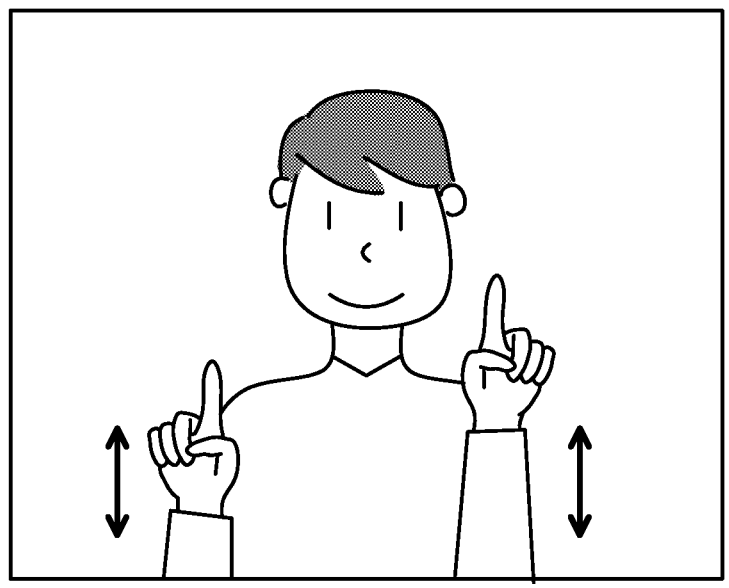
FIGS. 8A, 8B, 8C, 8D, 8E, and 8F are explanatory diagrams of examples of a movement of a two-handed same-shape sign in general sign language motions.

FIGS. 8A, 8B, 8C, 8D, 8E, and 8F are explanatory diagrams of examples of the movement of the two-handed same-shape sign in general sign language motions. For example, as depicted in FIG. 8A, the "up-and-down movement" is to move the hands up and down. In FIG. 8A, the "handshape" is the "ㅌ-form" (FIG. 6B), and both hands in the handshape are alternately moved up and down once or twice to indicate the words "which", "anyway", "whether", "compare", and "comparison". This sign language motion represents which one is better by alternately moving both hands up and down once or twice.

Figure 8B:
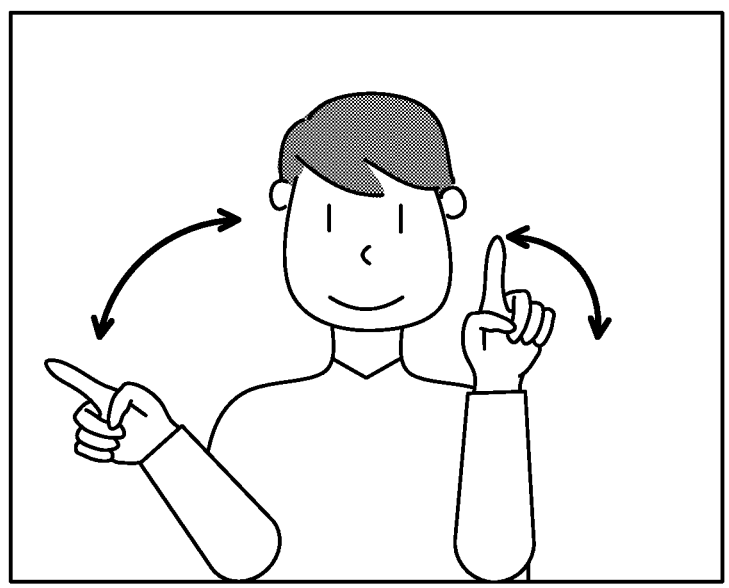

As depicted in FIG. 8B, the "back-and-forth movement" is to move the hands back and forth. In FIG. 8B, the "handshape" is the "ㅌ-form" (FIG. 6B), and both hands in the handshape, i.e., the index fingers of both hands located at both sides of the face are alternately lightly shaken back and forth to indicate the words "play" and "sword fight". This sign language motion represents swinging sticks in a play by mimicking a sword fight by alternately lightly shaking the index fingers of both hands back and forth.

Figure 8C:
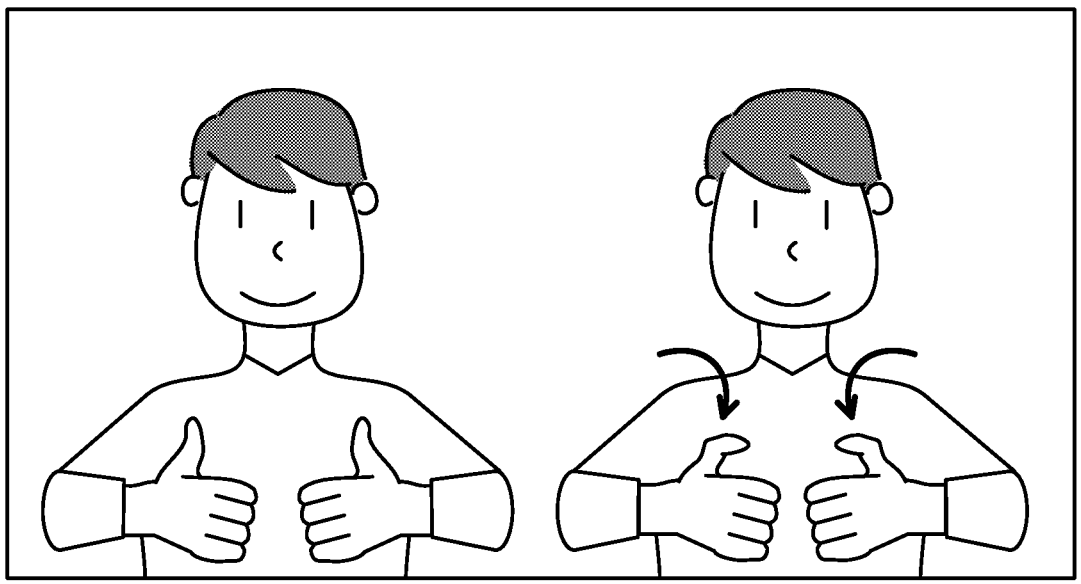

As depicted in FIG. 8C, the "movement in situ" is to move the fingers at the same positions. In FIG. 8C, the "handshape" is the "ㅑ-form" (FIG. 6J) and, while both hands in the handshape, i.e., the thumbs of both hands are allowed to face each other, the fingertips are bent toward both thumbs to indicate the word "greeting". This sign language motion represents a state of greeting by bending the fingertips of the thumbs likened to persons.

Figure 8D:
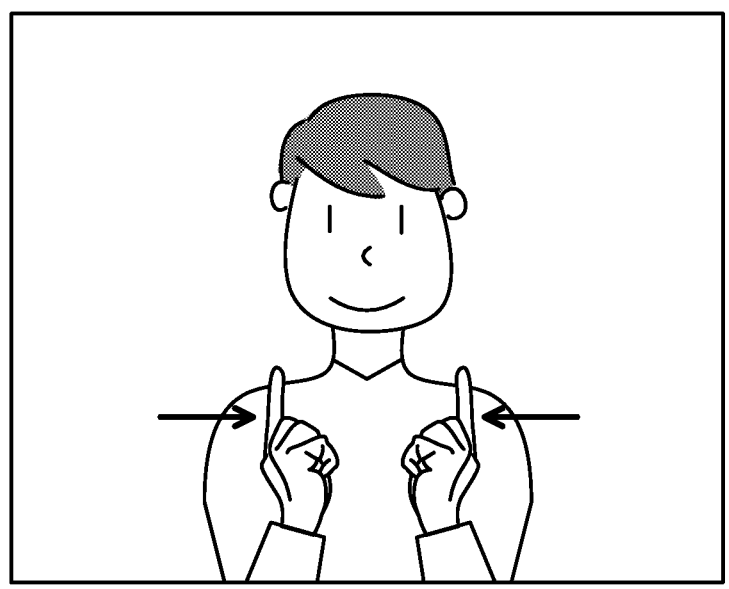

As depicted in FIG. 8D, the "right-and-left movement" is to move the hands right and left. In FIG. 8D, the "handshape" is the "ㅌ-form" (FIG. 6B), and both hands in the handshape, i.e., the index finger of both hands held up on the right and left sides of the body, are put together in front of the chest with the palms of both hands facing each other to indicate the words "meet", "interview", and "meeting". This sign language motion represents a state of meeting with the index fingers likened to persons.

Figure 8E:
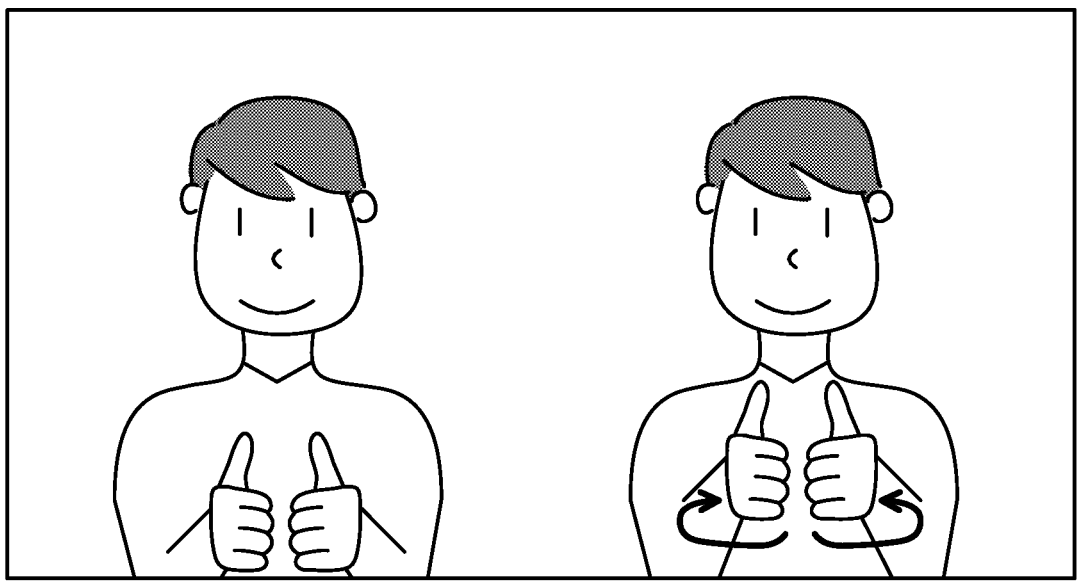

As depicted in FIG. 8E, the "circular movement" is to move the hands such that the fingertips draw a circle. In FIG. 8E, the "handshape" is the "ㅑ-form" (FIG. 6J), and both hands in the handshape are put forward side by side, separated to the left and right, moved backward to draw a circle on the horizontal plane, and then put together to indicate the words "man", "male", and "men". This sign language motion represents a group of "men".

Figure 8F:

As depicted in FIG. 8F, the "no movement" is the absence of movement of the hand without changing a position. In FIG. 8F, the "handshape" is the "ㅌ-form" (FIG. 6B) and the "single form", and while both hands are closed into fists except the index fingers, the index finger of one hand is extended sideways (the "single form") and the index finger of the other hand is held up behind (the "single form"). The palm of the hand located behind is directed sideways to indicate the word "science". This sign language motion represents an image of a rocket rising from a plain.

In the case of the "two-handed different-shape sign", for example, a combination of both "handshapes" including the "handshape" of the dominant hand and the "handshape" of the non-dominant hand may be used as a feature point. With regard to the non-dominant hand, the shape of the "arm" not appearing in the "handshape" of the dominant hand may also be used as a feature point.

Figure 9A:
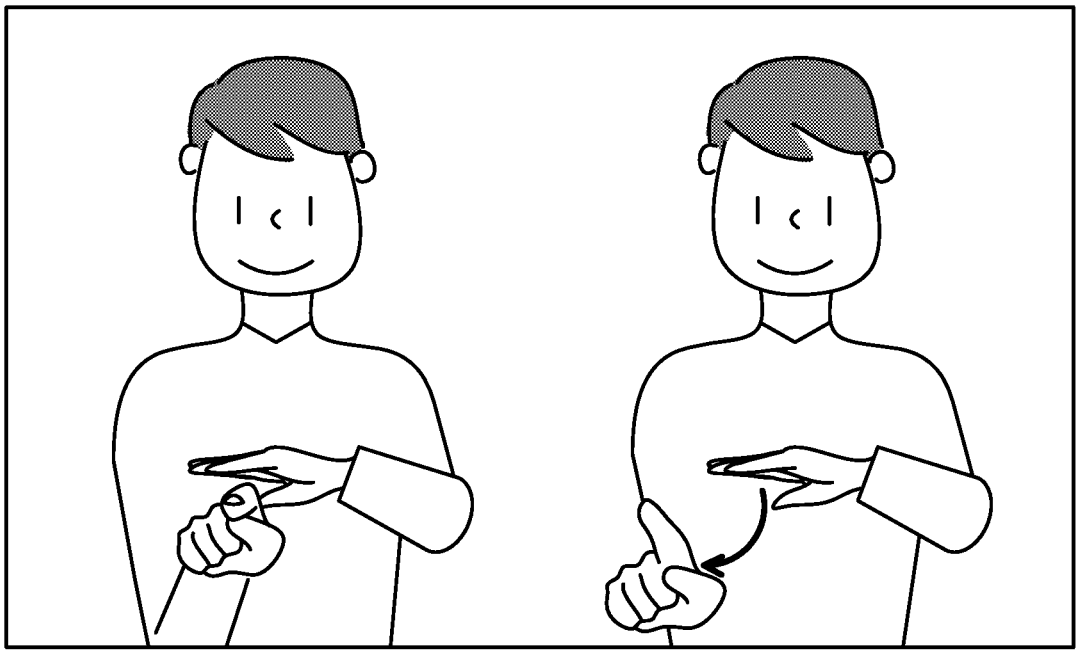
FIGS. 9A and 9B are explanatory diagrams of examples of the handshape of a two-handed different-shape sign in general sign language motions.
Figure 9B:
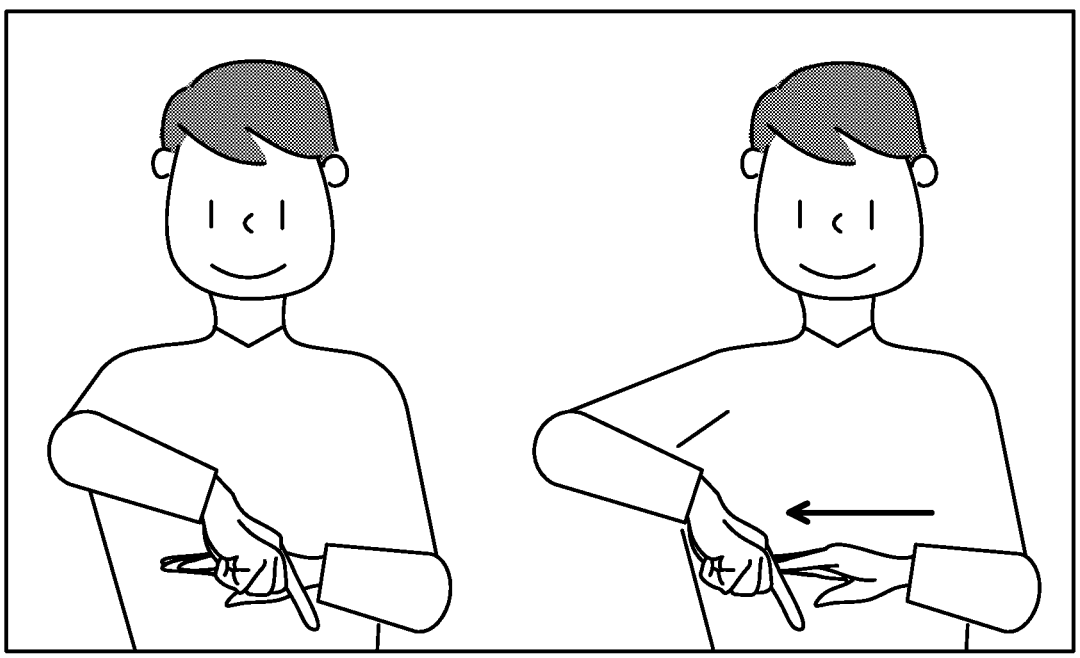

FIGS. 9A and 9B are explanatory diagrams of examples of the handshape of the two-handed different-shape sign in general sign language motions. For example, as depicted in FIG. 9A, when the handshape of the dominant hand is the "ㅕ-form" (FIG. 6A) and the hand of the non-dominant hand is the "テ ↓ form" (FIG. 6G), the palm of the non-dominant hand ("テ ↓ form") is directed downward and the index finger of the dominant hand (" ソ -form") is moved through under the somewhat rounded hand to indicate the words "why", "how", "meaning", "reason", "cause", and "inquiry". This sign language motion represents a state of exploring hidden things.

As depicted in FIG. 9B, when the shape of the dominant hand is the "index finger downward" and the non-dominant hand is in the " テ ↓ form", the non-dominant hand (" テ ↓ form") is presented with the fingertips directed sideways and the palm directed downward, and the tip of the index finger of the dominant hand ("index finger downward") is moved along the little-finger side of the hand to indicate the words "draw (a line)", "design", "ruler", "schedule", "plan", and "intended to". This sign language motion represents a gesture of drawing a line with a ruler to create a schedule.

Some "handshapes" do not appear on the non-dominant hand. Although not depicted, examples include a "ring finger", the " キ -form", the " ジ -form", the " ス -form", the " セ -form", the " フ -form", the " ル -form", the " ロ -form", etc. If such a form appears, it may be determined that the hand is the dominant hand.

In this way, after determining whether the sign language motion in the sign language image is the "one-handed sign", the "two-handed same-shape sign", or the "two-handed different-shape sign", unique feature points in each sign may be determined to extract the determined feature points.

Also for these feature points, the machine learning may be performed in advance by using the artificial intelligence algorithm to determine a portion in which a feature point is extracted and a portion in which a feature point is not extracted (ignored).

As described above, the sign language motions are motions including the shape of the hand, the position of the hand, the movement of the hand, etc., and the feature points indicate the characteristic portions of these motions. The feature points of the sign language motions may be extracted for each of the multiple classified "handshapes", or the input sign language images may be classified into the "one-handed sign", the "two-handed same-shape sign", and the "two-handed different-shape sign", and the feature points of the sign language motions may be extracted in each of the classified signs.

After determining the types of the sign language motions in the sign language images as the "one-handed sign", the "two-handed same-shape sign", and the "two-handed different-shape sign", the unique feature points in the respective types may be determined to extract the determined feature points.

Furthermore, the "non-hand/finger motion" may be used as a feature point. The "non-hand/finger motion" is an element other than the movement of the hand including a facial expression of a sign language signer and a posture of a sign language signer. For the facial expressions of the sign language signer, an image recognition processing function is applied using facial expression recognition. With regard to the posture of the sign language signer, although not depicted, for example, information such as the angle of the neck, the position of the shoulder, the position and angle of the elbow, etc. of the sign language signer may be extracted from the sign language images to use this information as the feature points.

Also for these feature points, as with other feature points, the machine learning may be performed in advance by using the artificial intelligence algorithm to determine a portion in which a feature point is extracted and a portion in which a feature point is not extracted (ignored).

The analysis process (step S503 to step S509 in the flowchart of FIG. 5) executed by the sign language motion analyzing unit 302 for analyzing a common or a differing point between a sign language motion and another sign language motion for each of the extracted feature points will be described in detail with reference to FIGS. 10A to 10G. FIGS. 10A, 10B, 10O, 10D, 10E, 10F, and 10G are explanatory diagrams of examples of sign language motions for the natural language "hot" and, although the sign language motions are different, all the motions are sign language motions defined as the natural language "hot".

Figure 10A:

The sign language motion of FIG. 10A is the "one-handed sign" using the "handshape" of the "fist vertical" (see FIG. 6C) and the position of the hand at the "neck" (see FIG. 7C), and the fist is held vertically and swung near the neck. In addition to "hot", this sign language motion has the meaning of "summer", "south", "Japanese fan", and "folding fan". Since the "Japanese fan" is used in "summer" and the heat comes from the "south", the motion represents "hot".

Figure 10B:
Figure 10C:

The sign language motion of FIG. 10B is the "one-handed sign" using the "handshape" of the " ゥ -form" (see FIG. 6I) and the position of the hand at the "neck" (see FIG. 7C), and the hand of the finger character " ゥ " is swung toward the neck of the sign language signer. As is the case with FIG. 10A, in addition to "hot", this sign language motion has the meaning of "summer", "south", "Japanese fan", and "folding fan". As is the case with FIG. 10A, since the "Japanese fan" is used in "summer" and the heat comes from the "south", the motion represents "hot".

The sign language motion of FIG. 10O is the "one-handed sign" using the "handshape" of the " ゥ -form" (see FIG. 6J) and the position of the hand at the "neck" (see FIG. 7C), and the hand of the finger character " ゥ " is swung near the neck of the sign language signer. As is the case with FIGS. 10A and 10B, in addition to "hot", this sign language motion has the meaning of "summer", "south", "Japanese fan", and "folding fan". As is the case with FIGS. 10A and 10B, since the "Japanese fan" is used in "summer" and the heat comes from the "south", the motion represents "hot".

As described above, if the "handshape" is used as the feature points of FIGS. 10A, 10B, and 10O, the shapes are the "fist vertical", the " ゥ -form", and the " ゥ -form", respectively different from each other and considered as respective differing points. However, since the position of the hand is the same and the action of swinging the hand (like using a "Japanese fan" or a "folding fan") is the same, these points may be considered as common points.

With regard to the "handshape", although the shapes of the hands are different, the sign language signers all form the "handshapes" supposed to represent the "Japanese fan" or the "folding fan" and the handshapes may be analyzed as having a commonality in that respect. The common point may be derived from these sign language motions in terms of sending wind to the body and blowing away the hot air around the body in an attempt to lower the body temperature, to cause the deducing unit 303 to deduce the semantic content that the natural language "hot" means a state in which the body temperature needs to be reduced.

Figure 10D:

The sign language motion of FIG. 10D is the "one-handed sign" using the "handshape" of the " ヒ -form" (see FIG. 6L) and the position of the hand at the "temple" (see FIG. 7B), and the tips of the thumb and the index finger are put together, placed on the temple, and moved downward. During this motion, the other fingers are closed into a fist. In addition to "hot", this sign language motion has the meaning of "perspiration", "perspiring", and "summer". This motion indicates a line of perspiration running down and represents "summer" and "hot" because summer is hot and perspiration is secreted.

Figure 10E:
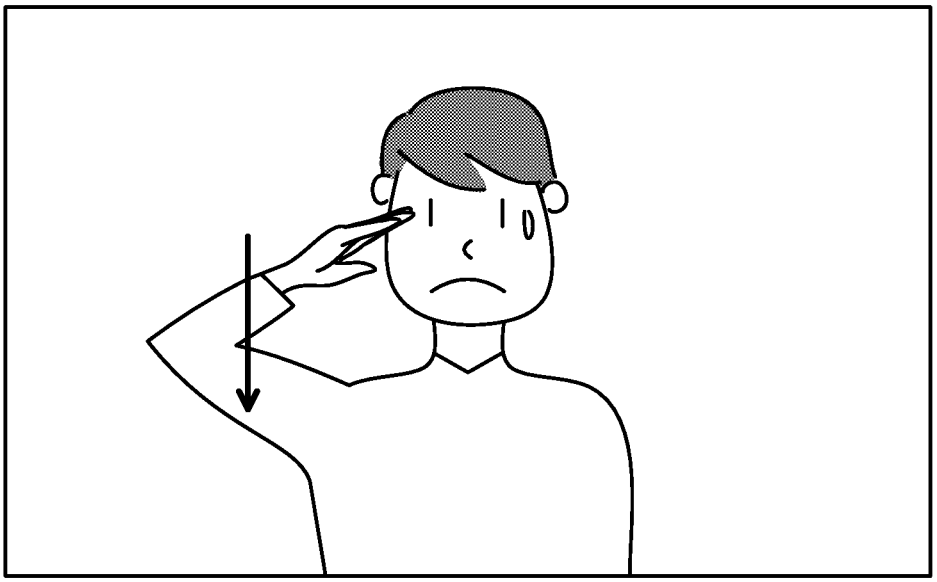

The sign language motion in FIG. 10E is the "one-handed sign" using the "handshape" of the "テ ↓ form" (made with an action of moving the hand from the upper side to the lower side) (see FIG. 6G) and the position of the hand at the "temple" (see FIG. 7B), and the fingertips of the hand with the palm directed downward are placed on the temple and then pulled downward. The motion is repeated a number of times for emphasis. In addition to "hot", this sign language motion has the meaning of "perspiration", "perspiring", and "summer". This motion indicates a heavily perspiring state and represents "summer" and "hot" because summer is hot and perspiration is secreted as is the case with FIG. 10D.

Figure 10F:
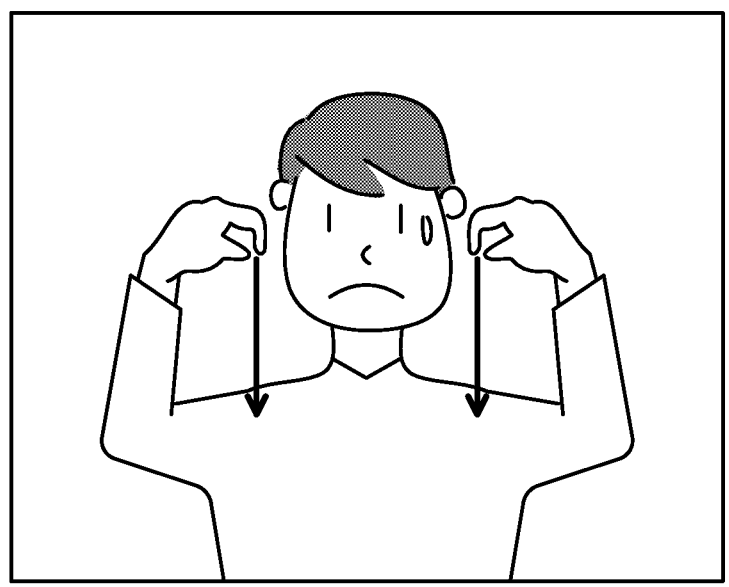

The sign language motion of FIG. 10F is the "two-handed sign" using the "handshape" of the "MO-form" (see FIG. 6L) and the "up-and-down movement" of both hands (see FIG. 8A), and the fingertips of both hands of the finger character "MO" are placed on both temples and then pulled downward at the same time. As is the case with FIG. 10E, the motion is repeated a number of times for emphasis. As is the case with FIGS. 10D and 10E, in addition to "hot", this sign language motion has the meaning of "perspiration", "perspiring", and "summer". This motion indicates a heavily perspiring state and represents "summer" and "hot" because summer is hot and perspiration is secreted as is the case with FIGS. 10D and 10E.

Figure 10G:
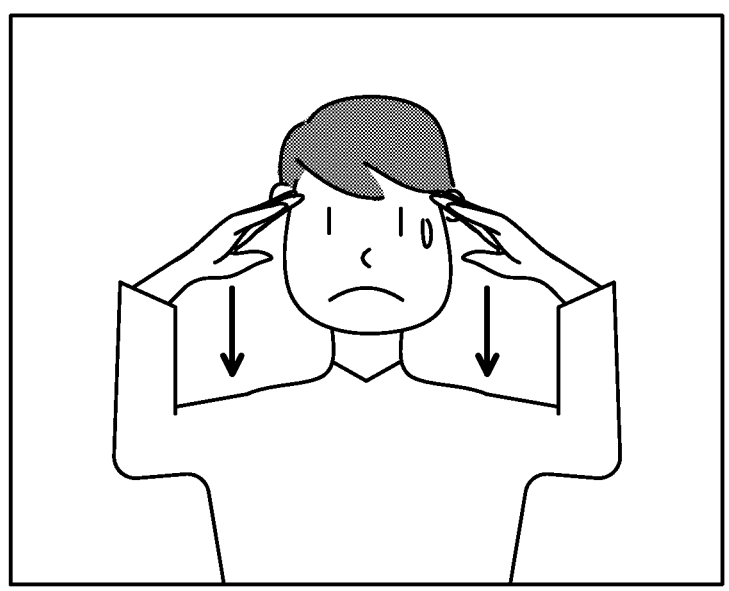

The sign language motion of FIG. 10G is the "two-handed sign" using the "handshape" of the "テ ↓ form" (made with an action of moving the hand from the upper side to the lower side) (see FIG. 6G) and the "up-and-down movement" of both hands (see FIG. 8A), and the fingertips of both hands are placed on the temples and then pulled downward. As is the case with FIGS. 10D to 10F, the motion is repeated a number of times for emphasis. As is the case with FIGS. 10D to 10F, in addition to "hot", this sign language motion has the meaning of "perspiration", "perspiring", and "summer". This motion indicates a heavily perspiring state and represents "summer" and "hot" because summer is hot and perspiration is secreted as is the case with FIGS. 10D to 10F.

As described above, the motions are different in that FIGS. 10D and 10E depict the "one-handed sign" while FIGS. 10F and 10G depict the "two-handed same-shape sign". This is considered as a differing point. If the "handshape" is used as the feature points of FIGS. 10D to 10G, although FIGS. 10D and 10F are identical in that both motions use the "モ-form" and FIGS. 10E and 10G are identical in that both motions use the "テ ↓ form" (made with an action of moving the hand from the upper side to the lower side), the "handshapes" are different between FIGS. 10D/10F and FIGS. 10E/10G and this is considered as a differing point.

However, since the positions of the hands are the same and the action of moving the hands downward (like perspiration running down) is the same, these points are considered as common points.

Although the motions have a difference between one hand and two hands and use the different shapes of the hands in terms of the "handshape", the sign language signers all form the "handshapes" that are supposed to represent perspiration running down from the temple and the motions may be analyzed as having a commonality in that respect. The common point may be derived from these sign language motions in terms of a situation in which perspiration runs down, to allow the deducing unit 303 to deduce the semantic content that the natural language "hot" means a state in which the body temperature has risen.

In this case, by using together a video or a context evoking the natural language "hot", for example, a video of the sun glaring followed by a person wiping perspiration, an image or a video of a person perspiring in front of fire of a boiler, and an image or a video of a person feeling hot in a sauna as a "related image", the semantic content of the natural language "hot" may be more correctly and diversely comprehended.

The analysis process (step S510 in the flowchart of FIG. 5) executed by the deducing unit 303 for deducing semantic content of a natural language element from the analyzed common or differing points will be described with reference to FIGS. 11A to 11G. FIGS. 11A, 11B, 11O, 11D, 11E, 11F, and 11G are explanatory diagrams of examples of sign language motions for the natural language "love" and, although the sign language motions are different, all the motions are sign language motions defined as the natural language "love".

Figure 11A:
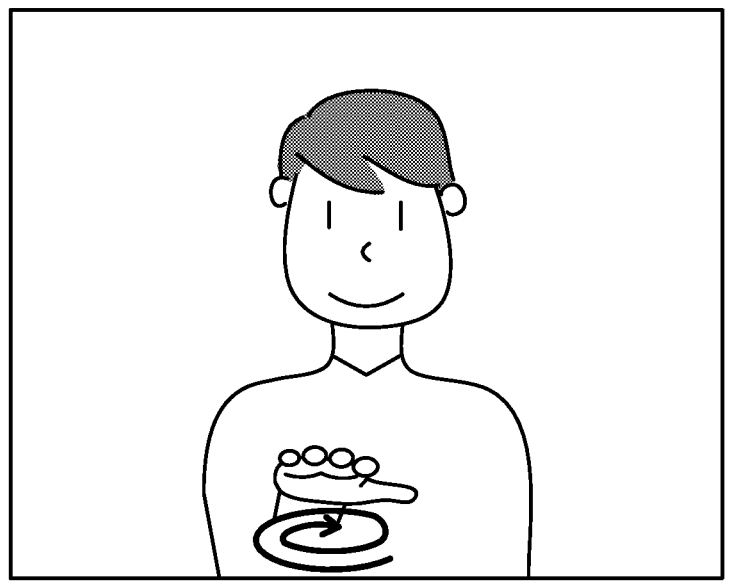

The sign language motion of FIG. 11A is the "one-handed sign" using the "handshape" of the "テ ↓ form" (made with an action of moving the hand from the upper side to the lower side) (see FIG. 6G), and the hand with the fingertip directed forward and the palm directed downward is moved in front of the chest to draw a smallish circle on the horizontal plane. In addition to "love", this sign language motion has the meaning of "important" and "adorable". This motion represents a gesture of careful stroking.

Figure 11B:
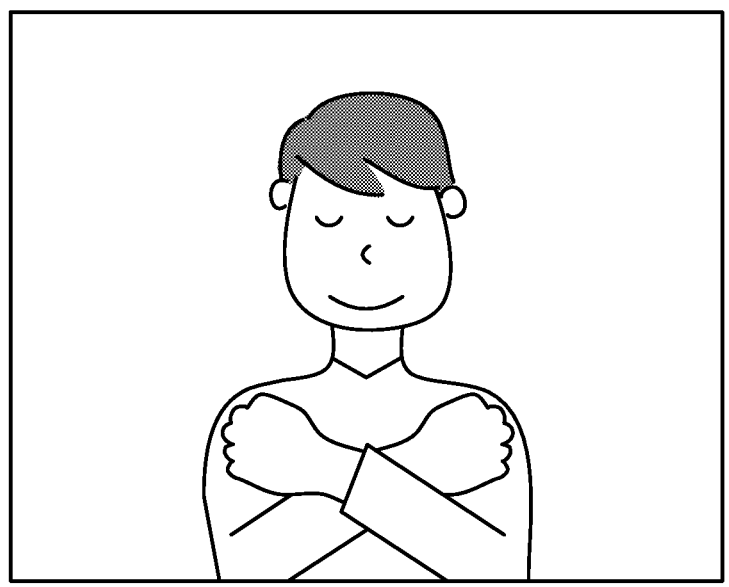

The sign language motion of FIG. 11B is the "two-handed same-shape sign" using the "handshape" of the "fist vertical" (see FIG. 6C) and both hands with the "no movement" (see FIG. 8F), and the fists of both hands are made vertical with the arms crossed into a "x" mark near the chest like embracing. This motion represents a state of tightly embracing the heart.

Figure 11C:
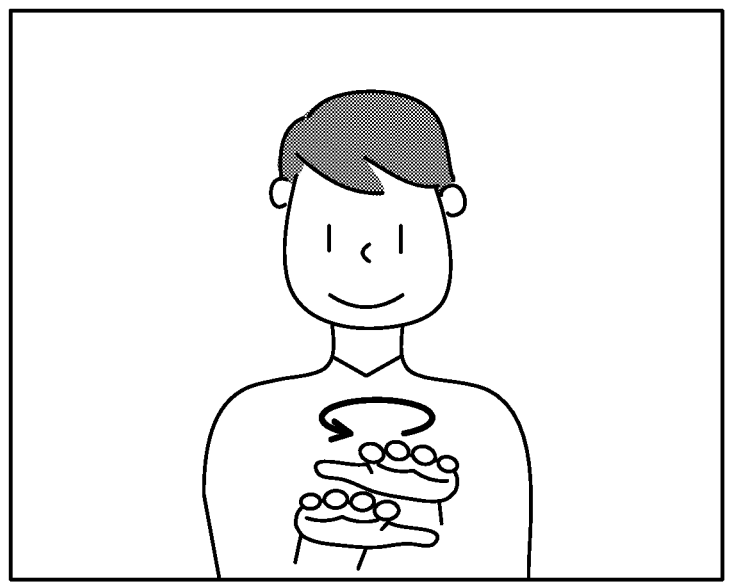
Figure 11D:
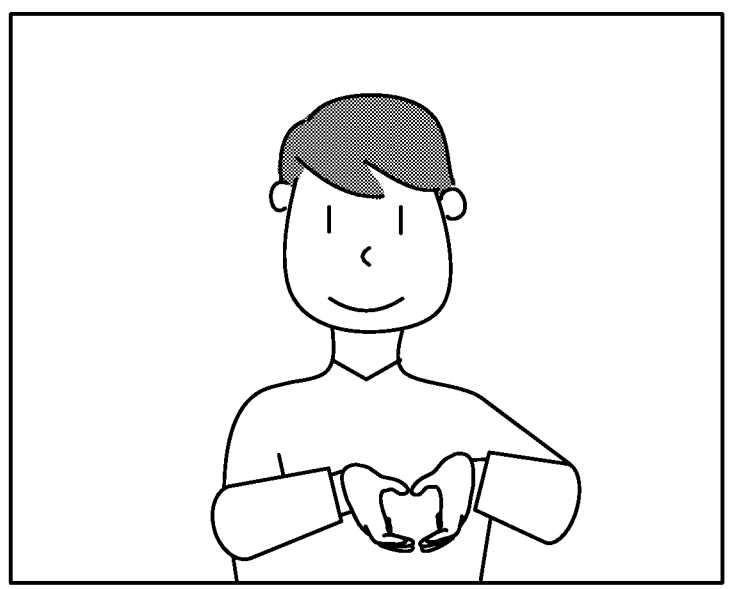

The sign language motion of FIG. 11C is the "two-handed same-shape sign" using the "handshape" of the "テ ↓ form" (see FIG. 6G) and both hands with the "movement in situ" (see FIG. 8C), and the palm of the hand is moved to stroke the back of the other hand. In this case, both hands are moved to intersect into a "x" mark. In addition to "love", this sign language motion has the meaning of "important", "precious", "significant", and "adorable". The motion also has the meaning of "Aichi". In this sign language motion, as is the case with FIG. 11A, the point is a carefully stroking action.

The sign language motion of FIG. 11D is the "two-handed same-shape sign" using the "handshape" of the "C-form" (see FIG. 6H) and both hands with "no movement" (see FIG. 8F), and both hands of the finger alphabet "C" facing each other with the thumbs directed upward are put in front of the chest. In addition to "love", this sign language motion has the meaning of "heart" and "romance". This sign language motion represents "love" with the shape of the "heart".

Figure 11E:
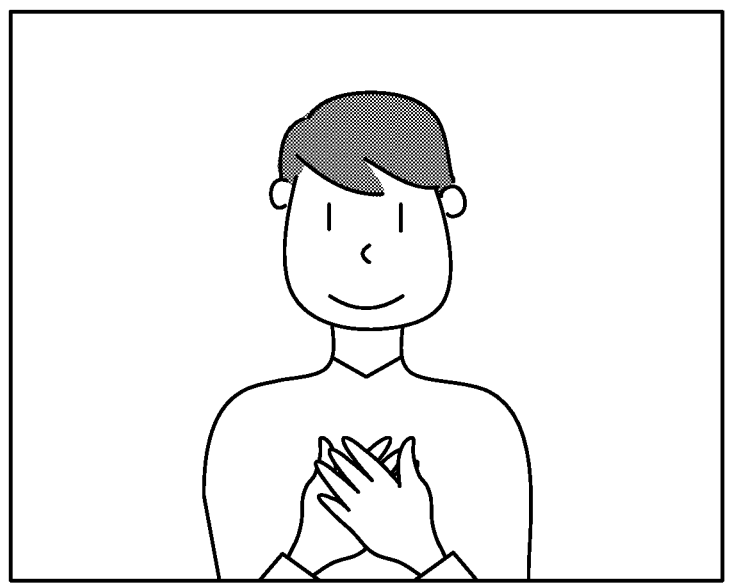
Figure 11F:
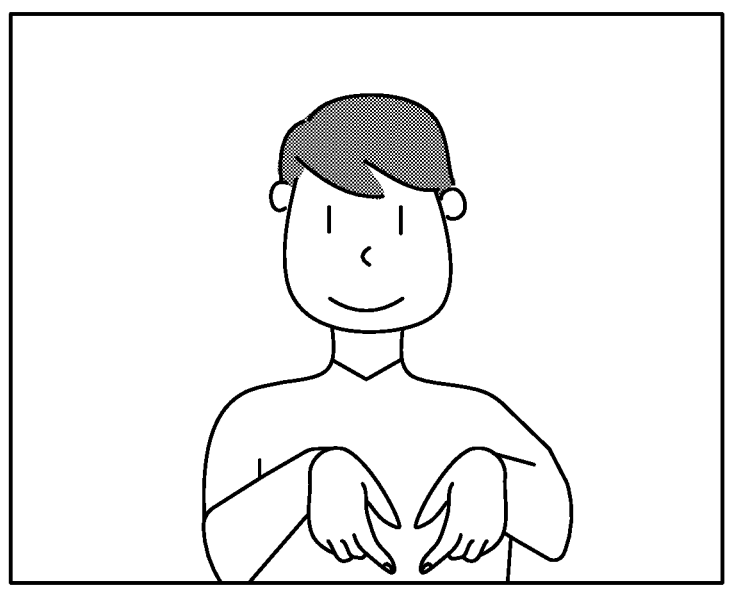

The sign language motion of FIG. 11E is the "two-handed same-shape sign" using the "handshape" of the "ら-form" (see FIG. 6I) and both hands with the "movement in situ" (see FIG. 8C), and both hands of the finger character "ら" are overlapped into a "x" mark at the chest. As is the case with FIG. 11B, the motion represents a state of tightly embracing the heart.

The sign language motion of FIG. 11F is the "two-handed same-shape sign" using the "handshape" of the "フ-form" (see FIG. 6K) and both hands with the "no movement" (see FIG. 8F), and the tips of the thumbs and the index fingers of the hands of the finger character "フ" are put together to form the shape of the heart. As is the case with FIG. 11D, in addition to "love", this sign language motion has the meaning of "heart" and "romance". This sign language motion represents "love" and "romance" with the shape of the "heart".

Figure 11G:
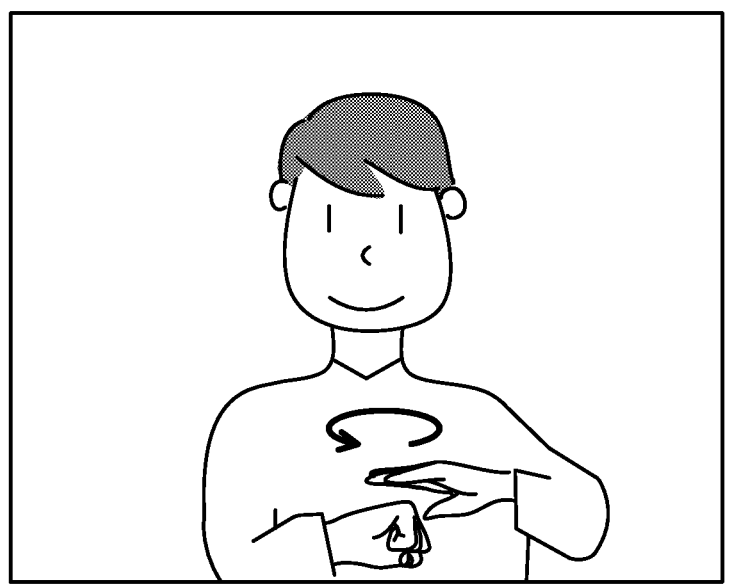

Also, the sign language motion of FIG. 11G is the "two-handed different-shape sign" using the "handshape" of the "テ ↓ form" (see FIG. 6G) and the other hand in the "handshape" of the "サ-form" (see FIG. 6D), and the palm of the hand is moved to stroke the back of the other hand of the finger character "サ". As is the case with FIG. 11C, in addition to "love", this sign language motion has the meaning of "important", "precious", "significant", "adorable", and "Aichi". In this sign language motion, as is the case with FIG. 11A, the point is a carefully stroking action. As is the case with FIGS. 11A and 11O, this motion represents a gesture of carefully stroking something one loves.

As described above, "carefully stroking", "showing a heart", and "embracing the chest (heart)" are extracted as the feature points used as common points of the sign language motion for the natural language "love". "Showing a heart" and "embracing the chest (heart)" may be regarded as common points through "heart" and, as compared to these points, "carefully stroking" may be regarded as a differing point because of the absence of a common point. Based on these common and differing points, the semantic content of the word "love" is deduced.

For example, it may be deduced from "carefully stroking" that the other party exists and that it is the thing (matter) for the other party. Additionally, since the "heart" appears, it may be deduced that it relates to the mind, i.e., emotion. In this way, multiple extracted feature points (common points/differing points) may be sorted out along with trial and error for multiple combinations, to perform the deduction of the semantic content of the word "love", which has been difficult.

A configuration of a neural network of the natural language processing apparatus of the embodiment according to the present invention will be described. FIG. 12 is an explanatory diagram of the configuration of the neural network of the natural language processing apparatus of the embodiment according to the present invention.

In FIG. 12, the neural network of the natural language processing apparatus of the embodiment according to the present invention includes an input layer 1201 and an output layer 1203, and further includes an intermediate layer 1202 between the input layer 1201 and the output layer 1203. Multiple circles "○" in each of the input layer 1201, the intermediate layer 1202, and the output layer 1203 indicate formal neurons and nodes. The sign language motion analyzing unit 302 and the deducing unit 303 depicted in FIG. 3 may each be desirably implemented by such a neural network.

In the neural network, by providing not only the input layer 1201 and the output layer 1203 but also the intermediate layer 1202, the number of layers of neuron groups executing processes increases. As a result, deeper thought may be achieved. Because of the increased neurons as compared to a network made up only of the input layer 1201 and the output layer 1203, the accuracy of analysis and deduction is improved or more versatile analysis and deduction may be provided, and analysis results and deduction results may be acquired through so-called "unsupervised learning".

The input layer 1201 transmits information regarding the feature points of sign language motion to a large number of neuron groups in the intermediate layer 1202. The neurons of the intermediate layer 1202 process the information and transmit an analysis result of the common/differing points and the information regarding the deduction result of the semantic content to the neurons of the output layer 1203 to execute a process. The neurons of the output layer 1203 output a processing result. An output result 1204 may be stored in the storage unit 304 depicted in FIG. 3.

Figure 15A:
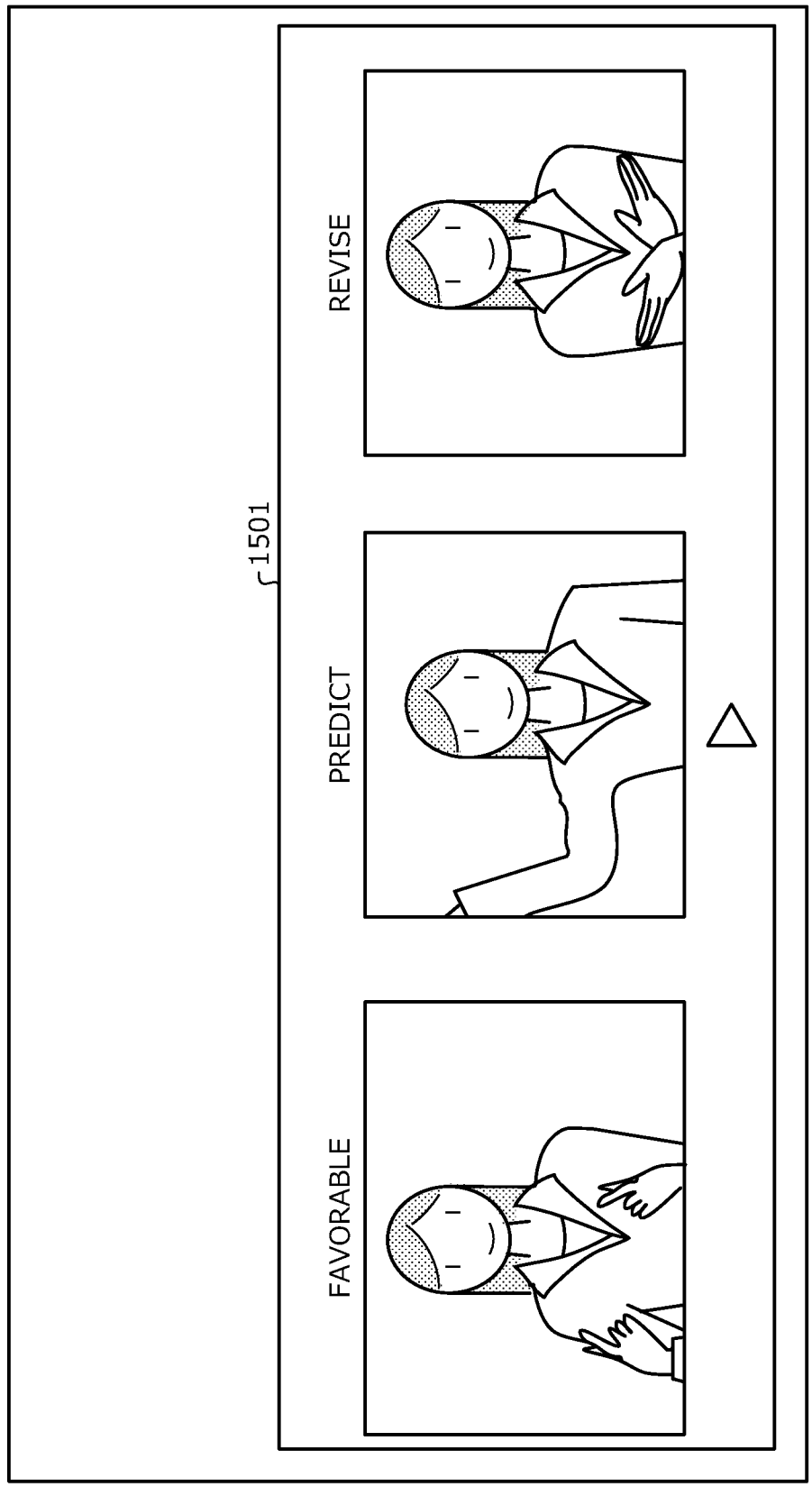

Procedures in a case of acquiring a sign language image created by a third party according to an application example of the present invention will be described. FIGS. 13A, 13B, 14A, 14B, 15A, and 15B are explanatory diagrams of contents of an application example of the embodiment according to the present invention. A sign language image 1301 depicted in FIG. 13A, a sign language image 1401 depicted in FIG. 14A, and a sign language image 1501 depicted in FIG. 15A are sign language images on the Internet searched and acquired by using a search key that is a digitized sign language motion representative of "TAKEDA MOTORS".

Figure 13A:
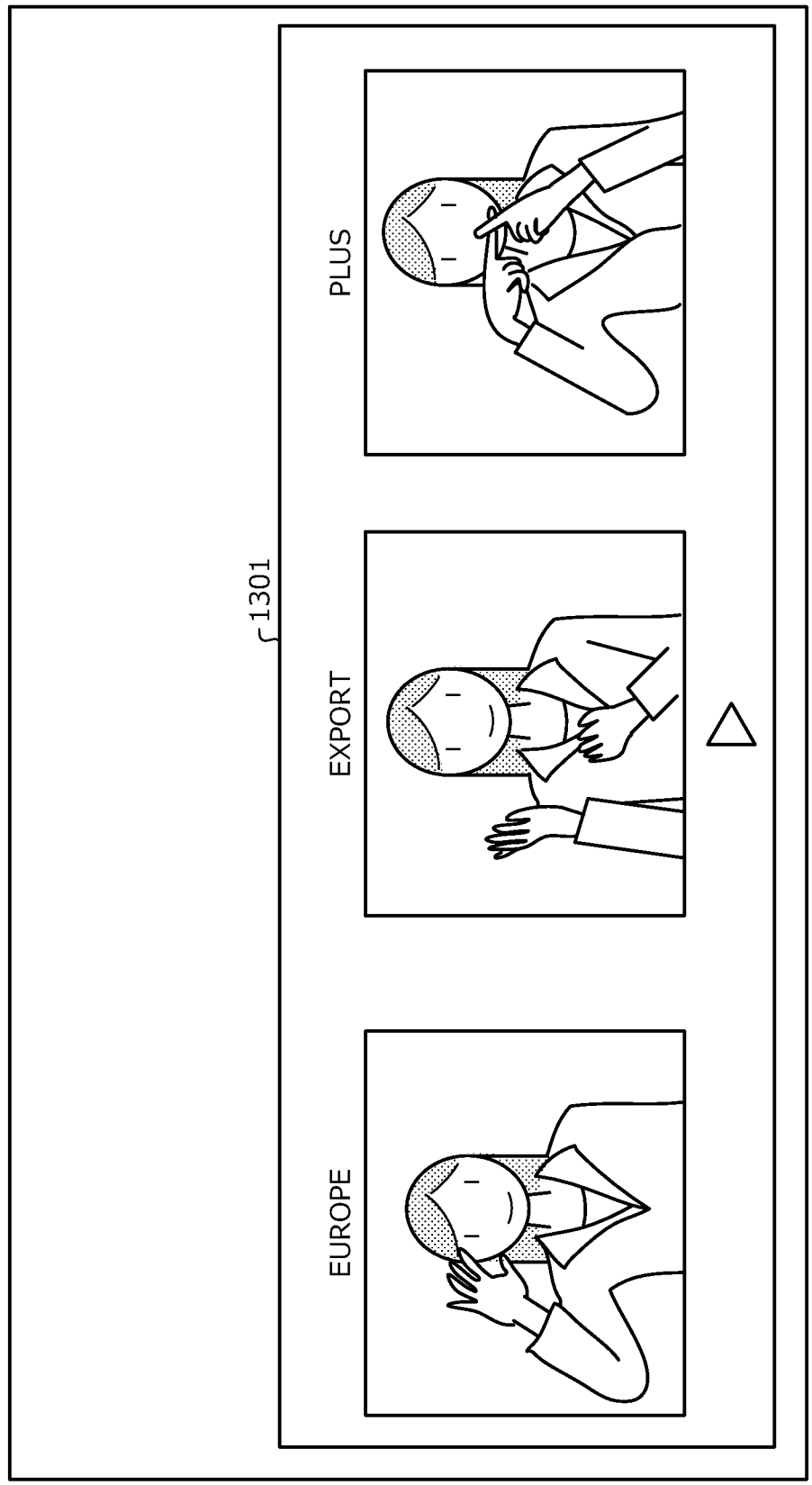

FIG. 13A depicts a state immediately after the acquisition of the sign language image 1301 and no semantic content is added in this state. Text 1302 displayed in FIG. 13B is a translation of the contents of the acquired sign language image 1301. A display of an evaluation stamp ("good evaluation") 1303 for a positive evaluation material indicates that the natural language processing apparatus has judged the sign language image as an image representative of a good evaluation for "TAKEDA MOTORS" from the context of the text 1302 and the facial expression of the sign language signer displayed on the sign language image 1301. The sign language image 1301, the translated text 1302, and the evaluation stamp 1303 are associated with each other and stored to the storage unit 304 depicted in FIG. 3.

FIG. 14A depicts a state immediately after the acquisition of the sign language image 1401 and no semantic content is added in this state. Text 1402 displayed in FIG. 14B is a translation of the contents of the acquired sign language image 1401. A display of an evaluation stamp ("poor evaluation") 1403 for a negative evaluation material indicates that the natural language processing apparatus has judged the sign language image to be an image representative of a poor evaluation for "TAKEDA MOTORS" from the context of the text 1402 and the facial expression of the sign language signer displayed on the sign language image 1401. The sign language image 1401, the translated text 1402, and the evaluation stamp 1403 are associated with each other and stored to the storage unit 304 depicted in FIG. 3.

FIG. 15A depicts a state immediately after the acquisition of the sign language image 1501 and no semantic content is added in this state. Text 1502 displayed in FIG. 15B is a translation of the contents of the acquired sign language image 1501. A display of an evaluation stamp ("good evaluation") 1503 for a positive evaluation material indicates that the natural language processing apparatus has judged the sign language image as an image representative of a good evaluation for "TAKEDA MOTORS" from the context of the text 1502 and the facial expression of the sign language signer displayed on the sign language image 1501. The sign language image 1501, the translated text 1502, and the evaluation stamp 1503 are associated with each other and stored to the storage unit 304 depicted in FIG. 3.

When it is assumed that a large amount of content created by a third party depicted in FIG. 4B exists on the Internet, that the profit structure of "TAKEDA MOTORS" is already acquired and learned from the Internet, and that the contents thereof are "domestic sales account for less than 30% and sales in Europe account for 40% or more of the sales amount", the natural language processing apparatus may judge that the meaning of the text 1502 is highly credible. Although the evaluation stamp 1503 gives representation of positive evaluation material, the stamp may be represented such that the evaluation of high credibility is added or that the evaluation is quantified.

With regard to the information regarding the semantic content stored in the storage unit 304 depicted in FIG. 3, the deduction may be performed based on, for example, information acquirable from the sign language images and separately acquired contents created by a third party on the Internet, not depicted. The information acquirable from the sign language images other than the translated text may be a facial expression of a sign language signer, a posture of a sign language signer, an emphasizing motion of sign language, a voice uttered by a sign language signer, movement of lips according to utterance by a sign language signer, etc.

Emotions may be deduced from the facial expression of the sign language signer, and the character of the sign language signer and a degree of confidence in sign language contents appear in the posture of the sign language signer and the magnitude of movement. A movement of a vigorous person tends to be large and a movement of a modest person tends to be small. A motion tends to be strong when a person is confident in the contents of the sign language, and a motion tends to be weak when a person is not confident. The emphasizing motion includes a large motion as well as repetitive expression.

If rising/falling, increasing/decreasing, etc. are expressed by a large motion, it may be expressed that the meaning of magnitude is important or that an amount of change is large. If the expression is small, the opposite meaning may be understood. In the case of notification of emergency evacuation, etc., repetitive expression of "hurry" may be used for emphasizing that one should hurry.

A sign language signer not only performs a sign language motion but also speaks in some cases, and a sign language image may include a voice interpreted from contents of the sign language motion of the sign language signer. This voice may be compared with a text translated from the sign language motion to closely examine translation contents. If no voice is added, voice contents may be deduced from lip reading.

As described above, the sign language image includes much information facilitating deduction of the semantic content of sign language other than a sign language motion, and using the sign language image is highly effective for allowing the computer to gain knowledge.

As described above, the natural language processing apparatus of the embodiment according to the present invention is a natural language processing apparatus configured to analyze a natural language element by using the artificial intelligence algorithm. The natural language processing apparatus includes the input unit 301 configured to, for each natural language element, input multiple sign language images for a certain natural language element together with the natural language element; the sign language motion analyzing unit 302 configured to extract multiple feature points of a sign language motion from the sign language images input by the input unit 301 and analyze a common point or a differing point between the sign language motion and another sign language motion, for each of the extracted feature points; the deducing unit 303 configured to deduce semantic content of the natural language element from the common point or the differing point analyzed by the sign language motion analyzing unit 302; and the storage unit 304 storing information regarding the semantic content deduced by the deducing unit 303 in association with the natural language element.

In this way, after a natural language element, i.e., character information, is once translated into sign language, the machine learning of the sign language image (or the sign language image and the character information) is performed. By inputting the image information, synonyms and words having similar meanings (such as "kind" and "thoughtful") may automatically be learned with higher accuracy (or less data amount). As a result, learning is enabled including learning of nuance, which has been impossible or difficult for artificial intelligence algorithms. In the future, a database for allowing artificial intelligence algorithms to understand the essential meaning of words may be constructed.

In this way, by associating image data (still images, moving images) of sign language with words, a large amount of sign language images is learned through deep learning and a large amount of words (natural language) is learned through deep learning. Furthermore, correlations between words and sign language images are learned through deep learning. This enables determination of correlations in the semantic contents of words, so that a word input as natural language may be combined with learned sign language images and comprehended as an abstract concept to determine the nuance.

In the natural language processing apparatus according to the present invention, the sign language motion analyzing unit 302 extracts from the sign language images input by the input unit 301, a feature point of a sign language motion for each of multiple classified handshapes.

In the natural language processing apparatus according to the present invention, the sign language motion analyzing unit 302 classifies the sign language images input by the input unit 301 into a one-hand sign that is a sign represented by one hand, a two-handed same-shape sign represented by two hands both forming the same shape, and a two-hand different-shape sign represented by two hands each forming a different shape and extracts a feature point of a sign language motion for each of the classified signs.

With this configuration, the most primary feature points of a sign language motion may efficiently and quickly be extracted.

In the natural language processing apparatus according to the present invention, the sign language motion analyzing unit 302 analyzes a common point or a differing point between a sign language motion and another sign language motion for each of the extracted feature points between the respective classified signs.

In the natural language processing apparatus according to the present invention, the sign language motion analyzing unit 302 extracts feature points related to a non-hand/finger motion that is an element other than hand movement and includes a facial expression of a sign language signer in addition to, or instead of, the sign language motion from the sign language images input by the input unit 301, and the sign language motion analyzing unit 302 analyzes a common point or a differing point between the sign language motion and another sign language motion for each of the extracted feature points.

With this configuration, the sign language motion analyzing unit 302 may efficiently and quickly analyze the common points and differing points of the feature points.

In the natural language processing apparatus according to the present invention, the deducing unit 303 deduces the semantic content of the natural language from a meaning of a handshape or a movement of the sign language motion.

In the natural language processing apparatus according to the present invention, the input unit 301 inputs a related image suggestive of the natural language in association with the natural language and the sign language images, and the deducing unit 302 deduces the semantic content of the natural language by using the related image.

With this configuration, the deducing unit 303 may accurately and diversely deduce the semantic content of the input natural language.

The natural language processing method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

As described above, the natural language processing apparatus, the natural language processing method, and the natural language processing program according to the present invention are suitable for building a language analysis database.

The natural language processing apparatus, the natural language processing method, and the natural language processing program according to the present invention provide an effect in that the image recognition technique of the artificial intelligence algorithm may be applied to the natural language understanding to create a natural language database enabling efficient and rapid processing and handling.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A natural language processing apparatus configured to analyze a plurality of natural language elements using an artificial intelligence algorithm, the natural language processing apparatus comprising:
   processing circuitry configured to
      input a plurality of sign language images for a certain natural language element together with the natural language element,
      extract for each feature point of sign language motion, a plurality of feature amounts of a plurality of sign language motions from the input sign language images, respectively,
   identify a common point or a differing point between a first sign language motion and a second sign language motion by comparing, for each feature point, a first feature amount of the first sign language motion and a second feature amount of the second sign language motion,
      deduce semantic content of the natural language element from the identified common point or differing point; and
   a storage configured to store in association with the natural language element, information regarding the deduced semantic content.

2. The natural language processing apparatus according to claim 1, wherein
   the processing circuitry extracts the feature amounts from the input sign language images, respectively, for each of a plurality of classified handshapes.

3. The natural language processing apparatus according to claim 1, wherein
   the processing circuitry is further configured to
      classify the input sign language images into a one-hand sign that is a sign represented by one hand, a two-handed same-shape sign represented by two hands both forming a same shape, and a two-hand different-shape sign represented by two hands each forming a different shape, and
   wherein the processing circuitry extracts the feature amounts from the input sign language images, respectively, for each of the classified signs.

4. The natural language processing apparatus according to claim 3, wherein
   the processing circuitry identifies the common point or the differing point for each of the classified signs.

5. The natural language processing apparatus according to claim 1, wherein
   the processing circuitry deduces the semantic content of the natural language element from a meaning of a handshape or a movement of the first and the second sign language motions.

6. The natural language processing apparatus according to claim 1, wherein
   the processing circuitry is further configured to
      extract from the input sign language images in addition to or instead of the first and the second feature amounts, feature amounts related to a non-hand/finger motion that is an element other than a hand movement and includes a facial expression of a sign language signer, and
   the processing circuitry identifies the common point or the differing point for each of the extracted feature amounts related to the non-hand/finger motion.

7. The natural language processing apparatus according to claim 6, wherein
   the processing circuitry is further configured to determine based on the extracted feature amounts related to the non-hand/finger motion, whether a given sign language image is an image representative of a positive evaluation for a given entity, or an image representative of a negative evaluation for the given entity.

8. The natural language processing apparatus according to claim 1, wherein the processing circuitry is further configured to
   input a related image suggestive of the natural language element together with the natural language element and the sign language images, and
   deduce the semantic content of the natural language element by using the related image.

9. A natural language processing method of analyzing a plurality of natural language elements using an artificial intelligence algorithm, the natural language processing method comprising:
   inputting, by processing circuitry of a computer, a plurality of sign language images for a certain natural language element together with the natural language element;
   extracting, by the processing circuitry of the computer, for each feature point of sign language motion, a plurality of feature amounts of a plurality of sign language motions from the sign language images, respectively, input at the inputting;
   identifying, by the processing circuitry of the computer, a common point or a differing point between a first sign language motion and a second sign language motion by comparing, for each feature point, a first feature amount of the first sign language motion and a second feature amount of the second sign language motion;

deducing, by the processing circuitry of the computer, semantic content of the natural language element from the common point or the differing point identified at the identifying; and storing, in a storage and in association with the natural language element, information regarding the semantic content deduced at the deducing.

10. The natural language processing method according to claim 9, wherein the extracting further comprises extracting the feature amounts from the input sign language images, respectively, for each of a plurality of classified handshapes.

11. The natural language processing method according to claim 9, further comprising:

classifying the input sign language images into a one-hand sign that is a sign represented by one hand, a two-handed same-shape sign represented by two hands both forming a same shape, and a two-hand different-shape sign represented by two hands each forming a different shape, and extracting the feature amounts from the input sign language images, respectively, for each of the classified signs.

12. The natural language processing method according to claim 11, wherein the identifying further includes identifying the common point or the differing point for each of the classified signs.

13. The natural language processing method according to claim 9, wherein the deducing further includes deducing the semantic content of the natural language element from a meaning of a handshape or a movement of the first and the second sign language motions.

14. The natural language processing method according to claim 9, Wherein the extracting further includes extracting from the input sign language images in addition to or instead of the first and the second feature amounts, feature amounts related to a non-hand/finger motion that is an element other than a hand movement and includes a facial expression of a sign language signer, and wherein the identifying further includes identifying a common point or a differing point for each of the extracted feature amounts related to the non-hand/finger motion.

15. The natural language processing method according to claim 14, further comprising determining based on the extracted feature amounts related to the non-hand/finger motion, whether a given sign language image is an image representative of a positive evaluation for a given entity, or an image representative of a negative evaluation for the given entity.

16. The natural language processing method according to claim 9, further comprising inputting a related image suggestive of the natural language element together with the natural language element and the sign language images, and deducing the semantic content of the natural language by using the related image.

17. A non-transitory, computer-readable recording medium storing therein a natural language processing program causing processing circuitry of a computer to execute a process of analyzing a plurality of natural language elements using an artificial intelligence algorithm, the process comprising:

inputting, a plurality of sign language images for a certain natural language element together with the natural language element;

extracting for each feature point of sign language motion, a plurality of feature amounts of a plurality of sign language motions from the sign language images, respectively, input at the inputting;

identifying a common point or a differing point between a first sign language motion and a second sign language motion by comparing, for each of feature point a first feature amount of the first sign language motion and a second feature amount of the second sign language motion;

deducing semantic content of the natural language element from the common point or the differing point identified at the identifying; and storing in association with the natural language element, information regarding the semantic content deduced at the deducing.

* * * * *